US012804071B2

(12) United States Patent
Merchant

(10) Patent No.: US 12,804,071 B2
(45) Date of Patent: Nov. 17, 2026

(54) SYSTEMS AND METHODS FOR CALL FRAUD ANALYSIS USING A MACHINE-LEARNING ARCHITECTURE AND MAINTAINING CALLER ANI PRIVACY

(71) Applicant: Pindrop Security, Inc., Atlanta, GA (US)

(72) Inventor: MohammedAli Merchant, Wilmington, DE (US)

(73) Assignee: Pindrop Security, Inc., Atlanta, GA (US)

( * ) Notice: Subject to any disclaimer, the term of this patent is extended or adjusted under 35 U.S.C. 154(b) by 317 days.

(21) Appl. No.: 18/413,524

(22) Filed: Jan. 16, 2024

(65) Prior Publication Data

US 2024/0267459 A1 Aug. 8, 2024

Related U.S. Application Data

(60) Provisional application No. 63/443,598, filed on Feb. 6, 2023, provisional application No. 63/443,603, filed (Continued)

(51) Int. Cl.
*H04M 3/42* (2006.01)
*H04M 3/436* (2006.01)

(52) U.S. Cl.
CPC ....... *H04M 3/42059* (2013.01); *H04M 3/436* (2013.01)

(58) Field of Classification Search
CPC . H04W 12/12; H04W 12/122; H04W 12/126; H04W 12/08; H04W 12/02; H04W 4/029; H04W 12/068; H04W 12/06; H04W 12/088; H04W 12/065; H04W 8/26; H04W 12/37; H04W 12/48; H04W 12/10; H04W 12/60; H04W 24/02; H04L 63/1425; H04L 63/1408; H04L 67/535; H04L 63/1441; H04L 63/1416; H04L 63/1433; H04L 63/0227; H04L 63/0245; H04L 2101/38;

(Continued)

(56) References Cited

U.S. PATENT DOCUMENTS 9,781,255 B1 * 10/2017 Gailloux ............... H04L 63/126
2012/0100830 A1 * 4/2012 Barber ............. H04M 3/42195 455/410

(Continued)

*Primary Examiner* — Kwasi Karikari
(74) *Attorney, Agent, or Firm* — Foley & Lardner LLP

(57) ABSTRACT

Disclosed are systems and methods including processes executed by a server that executes software routines for machine-learning architectures that receive call-invite messages containing data from a terminating carrier. The server a caller ANI and types of call data. The server further requests data from a telephony database. The server applies and executes the software programming of the machine-learning architecture on the call data (from the terminating carrier) and the portability data (from the telephony database) to generate risk scores. The server stores the data and the risk scores into a request database, until a provider server requests the risk scores in a threat assessment request. The server returns a threat assessment message to the provider server in response to the threat assessment request. The threat assessment message includes information about the caller or caller device, and the risk scores, but not the caller ANI.

20 Claims, 11 Drawing Sheets

Related U.S. Application Data on Feb. 6, 2023, provisional application No. 63/443,604, filed on Feb. 6, 2023, provisional application No. 63/443,599, filed on Feb. 6, 2023, provisional application No. 63/443,601, filed on Feb. 6, 2023.

(58) Field of Classification Search
CPC . H04L 63/105; H04L 63/0407; H04L 51/212; H04L 63/0263; H04L 41/149; H04L 63/0428; H04L 63/0414; H04L 45/08
See application file for complete search history.

(56) References Cited

U.S. PATENT DOCUMENTS

| | | | | |
|---|---|---|---|---|
| 2018/0324297 | A1* | 11/2018 | Kent | H04M 3/436 |
| 2021/0258421 | A1* | 8/2021 | Jakobsson | H04W 4/14 |
| 2023/0209351 | A1* | 6/2023 | Djankovic | H04W 12/12<br>455/411 |

* cited by examiner

500

SYSTEMS AND METHODS FOR CALL FRAUD ANALYSIS USING A MACHINE-LEARNING ARCHITECTURE AND MAINTAINING CALLER ANI PRIVACY

CROSS-REFERENCE TO RELATED APPLICATIONS

This application claims priority to U.S. Provisional Application Ser. No. 63/443,598, filed Feb. 6, 2023, U.S. Provisional Application Ser. No. 63/443,599, filed Feb. 6, 2023, U.S. Provisional Application Ser. No. 63/443,601, filed Feb. 6, 2023, U.S. Provisional Application Ser. No. 63/443,603, filed Feb. 6, 2023, and U.S. Provisional Application Ser. No. 63/443,604, filed Feb. 6, 2023, each of which is incorporated by reference in its entirety.

TECHNICAL FIELD

This application generally relates to systems and methods for managing, training, and deploying a machine learning architecture for call metadata processing.

BACKGROUND

Today's popular voice interaction systems and online computing services use speaker recognition to identify the users with biometrics, such as using aspects of a user's voice to identify the user as an expected speaker for personalization, as well as improving automatic speech recognition (ASR) and authorization features.

A problem is that certain regulatory regimes require telecommunications systems to implement technological controls that preserve caller privacy in certain circumstances. In these circumstances, authentication or caller recognition systems cannot implement machine-learning architectures to evaluate caller device metadata and caller biometrics or other authenticating patterns, or such technological controls render these machine-learning architectures less accurate. For example, in certain European regulatory regimes, when a caller requests the caller's phone number or automatic number identification (ANI) number remain private, then the telecommunications carriers and networks servicing the call must redact and keep private the caller's ANI from the destination system or destination device.

SUMMARY

Conventional approaches to evaluating and authenticating a call for an amount of risk associated with the call or caller device, or for authenticating the call or caller device, often rely upon or utilize a caller ANI. Conventional approaches also utilize information supplied from a called, destination, service provider system. In this way, the conventional approaches situate an analytics system to receive call data forwarded from a provider system for analytics operations. When the caller ANI must be redacted, the analytics system cannot offer or perform certain functions or benefits. A solution is to situate the analytics system between the called provider system and the caller, among the telecommunications networks and carriers. In this way, the analytics system benefits from access to the caller ANI and related information, yet still positioned to redact the caller ANI (or other caller information) from the destination provider system.

Disclosed herein are systems and methods capable of addressing the above-described shortcomings and may also provide any number of additional or alternative benefits and advantages. Embodiments include an analytics server (or other computing device) that executes software routines for one or more machine-learning architectures that receive call-invite messages containing call data from a terminating carrier that services a service provider system. The analytics server ingests the call data and extracts the caller ANI among other types of call data. The analytics server may further request additional portability data from a third-party telephony database. The analytics server applies and executes software programming routines of the machine-learning architecture on the call data (received from the terminating carrier) and the portability data (received from the telephony database) to generate one or more risk scores on behalf of the provider system. The analytics server stores the call data and the one or more risk scores into a request database, which stores the call data until a provider server requests the one or more risk scores in a threat assessment request. The analytics server returns a threat assessment message to the provider server in response to receiving the threat assessment request. The threat assessment message includes information about the caller or call device, and the one or more risk scores, but does not include the caller ANI. In some cases, the analytics server identifies a charge number, billing number, or other unique identifier, which the analytics server swaps with the caller ANI when communicating with the provider server.

In an embodiment, a computer-implemented method of assessing risks of calls without exposing caller automatic identification numbers (ANIs) to call destinations, the method comprising: receiving, by a computer of an analytics system, call data for a call from a calling device via a terminating carrier, the call data including telephony-protocol metadata indicating a caller ANI associated with the calling device and a destination identifier associated with a provider system; storing, by the computer, the call data into a request database of the analytics system, the call data including the telephony-protocol metadata and the destination identifier; generating, by the computer, one or more risk scores for the call by executing a machine-learning architecture on the call data; and transmitting, by the computer, a call connection instruction to the destination system based upon the one or more risk scores.

In another embodiment, a computer-implemented method of assessing risks of calls without exposing caller automatic identification numbers (ANIs) to call destinations, the method comprising: receiving, by a computer of an analytics system, call data for a call from a calling device via a terminating carrier, the call data including a caller ANI associated with the calling device and an a destination identifier associated with a provider system; obtaining, by the computer, a unique caller identifier associated with the caller ANI; storing, by the computer, the call data including the caller ANI and the unique caller identifier into a request database of the analytics system; retrieving, by the computer, at least a portion of the call data from the request database in response to receiving a score request from a provider server of a destination system; obtaining, by the computer, portability data from a telephony database using the unique caller identifier associated with the caller ANI; executing, by the computer, a machine-learning architecture on the call data and the portability data to generate one or more risk scores associated with the caller device; and transmitting, by the computer, the one or more risk scores and the unique caller identifier to the provider server of the destination system.

In another embodiment, a computer-implemented method of handling inbound calls with call data omitting caller automatic identification numbers (ANIs), the method comprising: receiving, by a computer of a provider system, from a terminating carrier, an indication of an inbound call and call data for the inbound call initiated at a calling device, the call data including a unique caller identifier exclusive of a caller ANI; transmitting, by the computer, a score request for one or more risk scores of the call to an analytics server of an analytics system; receiving, by the computer, the one or more risk scores of the inbound calling device from the analytics server; and executing, by the computer, a call-handling action based upon the one or more risk scores.

In another embodiment, a computer-implemented method of assessing risks for calls prior to routing to destination systems without revealing caller automatic identification identifiers (ANIs), the method comprising: receiving, by a computer of an analytics system from a terminating carrier, call data of a call initiated at a calling device via an originating carrier; identifying, by the computer, a caller ANI associated with the caller device in the call data; updating, by the computer, the call data for the caller device by replacing the caller ANI with a corresponding unique identifier; executing, by the computer, a machine-learning architecture on the call data to generate one or more risk scores for the caller device; and transmitting, by the computer to a provider server of a destination system, a risk assessment message including the one or more risk scores and the unique identifier.

In another embodiment, a computer-implemented method of assessing risks of calls without exposing caller automatic identification numbers (ANIs) to call destinations, method comprising: receiving, by a computer of an analytics system, a call-invite message from a caller device via a terminating carrier, the call-invite message including a caller ANI associated with the caller device; extracting, by the computer, at least a portion of the call-invite message as call data; updating, by the computer, the call data by replacing the caller ANI with a corresponding unique identifier for the caller device; executing, by the computer, a machine-learning architecture on the call data to generate one or more risk scores associated with the calling device; storing, by the computer, the call data and the one or more risk scores into a request database of the analytics system; in response to the computer receiving a risk assessment request from a provider server of a destination system: retrieving, by the computer, the call data and the one or more risk scores from the request database; and transmitting, by the computer, a risk assessment message indicating the one or more risk scores to the provider server.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
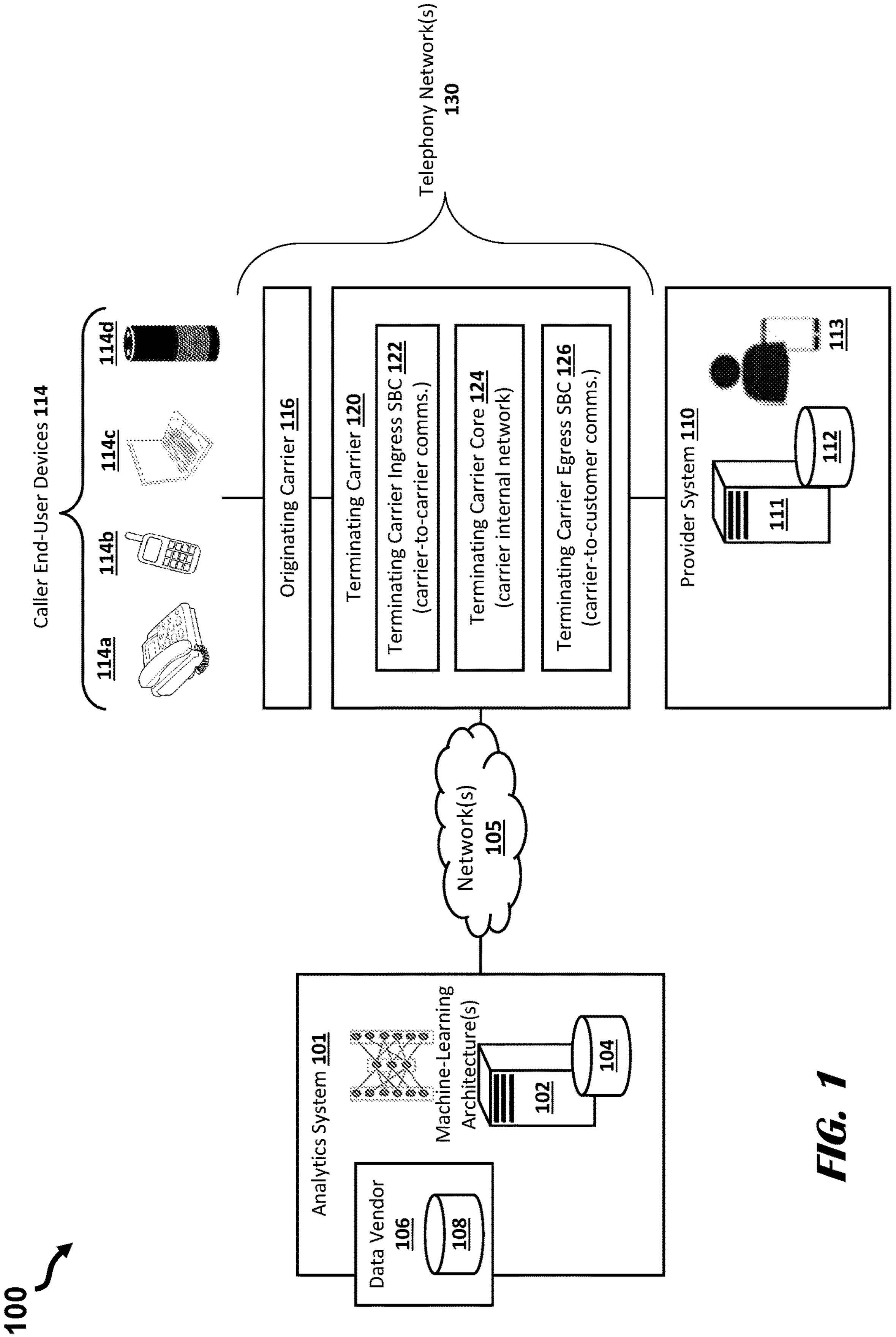
FIG. 1 shows components of a system for processing call data and authentication requests on behalf of provider systems, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 shows components of a system 100 for processing call data and authentication requests on behalf of provider systems 110. The system 100 comprises enterprise-computing infrastructures 101, 110, including an analytics system 101 and one or more service provider systems 110, one or more originating telecommunications carriers (originating carrier(s) 116), and one or more terminating telecommunications carriers (terminating carrier(s) 120). The system 100 further includes any number of end-user caller devices 114*a*-114*d* (collectively referred to as a "caller device 114" or "caller devices 114").

Embodiments may comprise additional or alternative components or omit certain components from what is shown in FIG. 1, yet still fall within the scope of this disclosure. For ease of description, FIG. 1 shows only one instance of various aspects the illustrative embodiment. However, other embodiments may comprise any number of the components. For instance, it will be common for there to be multiple provider systems 110, or for an analytics system 101 to have multiple analytics servers 102. Although FIG. 1 shows the illustrative system 100 having only a few of the various components, embodiments may include or otherwise implement any number of devices capable of performing the various features and tasks described herein. For example, in the illustrative system 100, an analytics server 102 is shown as a distinct computing device from an analytics database 104; but in some embodiments the analytics database 104 may be integrated into the analytics server 102, such that these features are integrated within a single device.

The illustrative system 100 of FIG. 1 comprises various network infrastructures 101, 106, 110, including a call analytics system 101, a third-party telephony service provider system (data vendor 106), and customer call centers 110. The network infrastructures 101, 106, 110 may be a physically and/or logically related collection of devices owned or managed by some enterprise organization, where the devices of each infrastructure 101, 106, 110 are configured to provide the intended services of the particular infrastructure 101, 106, 110 and responsible organization.

A call analytics system 101 is operated by a call analytics service that provides various call management, security, authentication, and analysis services to provider systems 110 of various customer organizations (e.g., corporate call centers, government entities). A caller may place a telephone call to the provider systems 110 of the various organizations. When the caller devices 114 originate telephone calls, the call data for the telephone calls are generated by the caller devices 114 and by the components of the telephony networks 130 and the carrier 116, 120 systems, such as switches and trunks. An originating carrier 116 of the caller device 114 routes the call to the terminating carrier 120 of the destination provider system 110 according to the call metadata, such as telephony protocol messages (e.g., SIP INVITE). The terminating carrier 120 extracts and forwards the call data to the call analytics system 101. The components of the analytics service 101 (e.g., analytics server 102) execute various analytics operations (e.g., risk assessment, risk scoring) using the call data, in order to provide call analytics services to the provider systems 110 of the customer organizations of the analytics service.

A third-party telephony service system (data vendor 106) is operated by a third-party organization offering telephony data services to organizations, such as the call analytics system 101. For instance, the third-party telephony services may provide high-level telecommunications or network governance and planning services, such as authoritative directory services, DNS services, ANI governance or registries, Caller ID governance or registries, and the like. In the illustrative system 100, the data vendor 106 is a separate company from the call analytics service, though it is not required; the data vendor 106 may be a sibling entity of the analytics service under a common parent entity. In some embodiments, there may not be a third-party data vendor 106, but rather the call analytics system 101 may comprise the hardware and software components of the data vendor 106 described herein. The data vendor 106 hosts a third-party database 108 containing various types of telephony information related to the caller devices 114, such as portability information about the caller devices 114, which the analytics server 102 queries for information about the caller devices 114 when executing the analytics operations assessing the caller devices 114. As shown in FIG. 1, the data vendor 106 comprises the telephony database 108 that stores the information about, for example, calling devices 114, ANIs, portability data for the caller devices 114, and Caller IDs, among other types of information about the carriers 116, 120 and devices.

Provider systems 110 are owned, managed, and/or operated by customer organizations (e.g., corporations, government entities) of the call analytics service. The provider systems 110 receive telephone calls from the callers, who may be consumers or users of the services offered by customer organizations via the provider systems 110. Devices of the provider system 110 receive certain types of call data with a call routed from a terminating carrier 120 of the provider system 110. The provider system 110 then transmits, via the one or more external networks 105, a request for a risk assessment or risk score to the analytics system 101. For instance, a customer may be a bank that operates a call center provider system 110 to handle calls from bank consumers regarding accounts and product offerings. The bank's call center forwards captured call data to the call analytics system 101. The analytics system 101 previously received the call data from the terminating carrier 120 and previously determined one or more risk scores of the call on behalf of the bank.

The caller devices 114 may be any electronic device comprising hardware and software components that end-user callers operate to place a call to callee-destinations (e.g., call centers or agents of provider systems 110) via one or more networks. Non-limiting examples of the caller devices 114 include landline phones 114*a* or mobile phones 114*b*. The caller devices 114 are not limited to telecommunications-oriented, telephony-based devices (e.g., telephones 114*a*, 114*b*). As an example, a caller device 114 may include an electronic device comprising a processor and/or software, such as a computer 114*c* or IoT device 114*d*, configured to implement voice-over-IP (VOIP) or other telephony-based telecommunications protocols. As another example, a caller device 114 may include an electronic device comprising a processor and/or software, such as an IoT device 114*d* (e.g., voice assistant device, "smart device"), capable of utilizing telecommunications features of a paired or otherwise internetworked caller device 114, such as mobile phone 114*b*. A caller device 114 may comprise hardware (e.g., microphone) and/or software (e.g., codec) for detecting and converting sound (e.g., caller's spoken utterance, ambient noise) into electrical audio signals. The caller device 114 then transmits the audio signal, along with other forms of call data, according to one or more telephony or other communications protocols to a called, destination provider system 110 for an established telephone call.

The system 100 includes any number of networks, including external networks 105 or internal networks (not shown), through which the devices of the system 100 (e.g., devices of enterprise computing infrastructures 101, 110, the caller devices 114) communicate with one another. The networks include, for example, computing communications networks for computing device communications (e.g., external networks 105) and telecommunications networks for telephony-based communications (telephony networks 130). For instance, the component computing devices of the analytics system 101 communicate within the logical or physical infrastructure of the analytics system 101 via one or more internal networks (not shown); and likewise the computing devices of the service provider system 110 communicate within the logical or physical infrastructure of the provider system 110 via one or more internal networks (not shown). For communicating beyond the logical or physical infrastructures 101, 110, the devices of the provider system 110 communicate with devices of the analytics system 101 via one or more external networks 105. The various computing networks (e.g., external networks 105, internal networks) of the system 100 comprise hardware and software components defining one or more public networks or private networks, interconnecting the various components of the system 100. Non-limiting examples of the computing networks may include Local Area Network (LAN), Wireless Local Area Network (WLAN), Metropolitan Area Network (MAN), Wide Area Network (WAN), and the Internet. Computing devices of the system 100 communicate via the various computing networks in accordance with various communication protocols, such as Transmission Control Protocol and Internet Protocol (TCP/IP), User Datagram Protocol (UDP), and IEEE communication protocols, and the like. The various hardware and software components may communicate with analytics system 101 over the external networks 105 through or using one or more APIs of the analytics system 101. The various types of data records or message queries (e.g., risk assessment request), may be stored, transmitted, and received in any number of formats or data types (e.g., JSON) via the one or more APIs.

As mentioned, the networks of the system 100 include one or more telephony networks 130 for telephony-based communications. In some cases, the caller devices 114 use the telephony-based networks 130 for communicating with the customer-facing service provider systems 110 or the analytics system 101 according to telephony and telecommunications protocols. The telephony network 130 includes hardware, and software capable of hosting, transporting, and exchanging call data, including audio data and metadata according to the particular telephony protocol(s). Non-limiting examples of telecommunications and/or computing networking hardware may include switches and trunks, among other additional or alternative hardware used for hosting, routing, or managing data communication, circuits, and signaling via the Internet or other device communications medium. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. In some cases, the caller devices 114 execute software and protocols for performing telephony-based communications via one or more computing networks.

When the caller device 114 places a telephone call to a provider system 110 (e.g., enterprise call center), the caller device 114 requests the telecommunications network 130 and the originating carrier 116 servicing the caller device 114 to originate and connect the telephone call to the provider system 110. The various components (e.g., switches, trunks, exchanges) of the telecommunications networks 130, the carriers 116, 120, and the caller devices 114 may generate various forms of the call data (e.g., audio signal data, metadata), which may be stored by the analytics system 101 or provider system 110 as one or more records (e.g., call record, caller record) into the analytics database 104 and/or the provider database 112. The call data may comprise metadata associated with a particular call, including received metadata or derived metadata, which includes various types of metadata generated by or received from components of telecommunications networks 130. Non-limiting examples of the metadata includes, a caller automatic number identifier (ANI), Caller ID, destination ANI, a geographic identifier (e.g., Number Planning Area (NPA), state, city), a carrier identifier for the carrier(s) 116, 126 associated with the telephone call or the calling device 114, and a line type (e.g., landline, cellular, VOIP), among other types of received or derived metadata.

Various different entities manage or organize the components of the telecommunications systems of the telephony networks 130, including carriers, networks, and exchanges, among others. For instance, the carriers (e.g., originating carriers 116, terminating carriers 120) may host, operate, and administer components of telecommunications networks 130 on behalf of the callers, caller devices 114, and the provider systems 110.

The originating carrier 116 of the telephony networks 130 represents a hardware and software components of a telecommunications carrier system that services a caller device 114. The caller device 114 places a call to originate telecom traffic for a new call (outbound from the caller device 114) directed to the originating carrier 116. The originating carrier 116 originates, hosts, and routes the call to a terminating carrier 120 of the provider system 110. The originating carrier 116 receives the various types of call data in the telecom traffic from the caller device 114, and routes the call based on the call data. For instance, the call data includes routing information or identifiers for the provider system 110, such as a destination ANI of the provider system 110 and/or a carrier identifier that indicates the terminating carrier 120 of the provider system 110.

The terminating carrier 120 of the telephony networks 130 represents a hardware and software components of a telecommunications carrier system that services the provider system 110. The terminating carrier 120 includes an ingress session border controller (SBC) (referred to as an "ingress SBC 122"), a terminating carrier core 124, and an egress SBC 126. The ingress SBC 122 includes hardware and software components for routing and handling carrier-to-carrier communications, including exchanging signaling data for the call with the originating carrier 116. The terminating carrier core 124 comprises internal hardware and software components defining the carrier's internal network for internally routing signaling data or other types of data between components of the terminating carrier 120. In some cases, the terminating carrier core 124 handles and communicates the call data (or other types of data) with the analytics system 101 via the external computing networks 105. The egress SBC 126 includes hardware and software components for routing and handling carrier-to-customer communications, including exchanging signaling data for the call with the provider system 110.

In operation, the ingress SBC 122 receives a new call-invite message (e.g., SIP INVITE) from the originating carrier 116 containing information about the caller device 114 and provider system 110. The terminating carrier core 124 routes the call from the ingress SBC 122 to the egress SBC 126 for directing the call to the provider system 110. The terminating carrier core 124 further extracts and transmits certain types of call data (e.g., audio signal, signaling metadata) to the analytics system 101, which the analytics server 102 of the analytics system 101 references to generate the one or more risk scores for the call on behalf of the provider system 110. The terminating carrier core 124 routes the call and call data to the egress SBC 126 nearest or otherwise optimal for servicing the provider system 110, according to the routing information of the telephony-data of the call-invite message. Likewise, the egress SBC 126 routes the call and call data to the provider system 110, according to the routing information of the telephony-data of the call-invite message.

The call analytics system 101 comprises an analytics server 102, an admin device (not shown), and an analytics database 104. The call analytics server 102 may receive the call data from the terminating carrier 120. The analytics server 102 may also retrieve various types of data from the analytics database 104 or provider database 112, including information about the caller device 114 or the caller or data structures (e.g., probability tables, metadata weights, feature vectors, trained machine-learning models) used for executing analytics operations for generating the one or more scores for the call. The analytics server 102 queries or otherwise receive certain types of data from a telephony database 108, which may be operated by a third-party service (data vendor 106) and may contain data about, for example, portability data, caller devices 114, carriers 116, 120, callers, and other types of information.

The analytics system 101 implements one or more machine-learning architectures having layers or functions defining various types of functional engines, including feature-extraction engines for analyzing call data and extracting various types of features and device recognition engines for identifying, recognizing, or authenticating callers based upon multi-model, multi-device, and/or frictionless authentication operations for calls originated from the caller devices 114 when placed to the provider systems 110. Embodiments may comprise additional or alternative components or omit certain components from those of FIG. 1A and still fall within the scope of this disclosure. It may be common, for example, for the analytics system 101 to include multiple analytics servers 102. Embodiments may include or otherwise implement any number of devices capable of performing the various features and tasks described herein. For example, FIG. 1A shows the analytics server 102 as a distinct computing device from the analytics database 104. In some embodiments, the analytics database 104 includes an integrated analytics server 102.

An analytics server 102 may be any computing device comprising one or more processors and software, and capable of performing the various processes and tasks described herein. The analytics server 102 may be in network-communication with databases 104, 108, 112, and may receive call data from the terminating carrier 120. Although FIG. 1 shows a single analytics server 102, it should be appreciated that, in some embodiments, the analytics server 102 may include any number of computing devices. In some cases, the computing devices of the analytics server 102 may perform all or sub-parts of the processes and benefits of the analytics server 102. It should also be appreciated that, in some embodiments, the analytics server 102 may comprise any number of computing devices operating in a cloud computing or virtual machine configuration.

The analytics server 102 of the analytics system 101 generates the risk scores for the calls using the call data (e.g., signaling data) of past and/or current inbound calls, as received from, for example, the terminating carrier 120 and data vendor 106. The analytics server 102 may generate a risk score for a current inbound call, and in turn determine whether the risk score satisfies a threshold value, which may be a call verification value or a threat risk threshold. Using the call data received from the terminating carrier 120, the analytics server 102 stores the risk score into a short-term storage location of the non-transitory storage medium of the analytics database 104 (or other database). The analytics server 102 receives a request for the risk score from the provider server 111 of the provider system 110 and returns the risk score information to the provider system 110. Notably, in certain circumstances, neither the analytics server 102 nor the telephony network(s) 130 ever reveal the actual caller ANI to the provider system 110. For example, the caller device 114 transmits a privacy instruction to the telephony networks 130, indicating the caller's desire for the telephony networks 130 to obscure and withhold the caller's ANI from the provider system 110.

The analytics server 102 executes the layers and functions of the machine-learning architecture in various operational phases, including a training phase, an optional enrollment phase, and a deployment phase (sometimes referred to as "testing" or "inference"). The analytics server 102 applies and executes software routines of the machine-learning architecture on input data (e.g., training data, enrollment data, deployment data) for a given call (e.g., training call, enrollment call, inbound call) based upon the particular operational phase. The layers and functions of the machine-learning architecture comprise software programming that define various operational engines or sub-components of the machine-learning architecture, such as input layers, feature extraction engine, and embedding extraction engine, among others.

The input layers ingest various types of input data for the call and perform various pre-processing operations or augmentation operations. The data augmentation operations generate various types of data spoofing or manipulation, distortion, or degradation of the call data, such that the operational layers of the machine-learning architecture (e.g., embedding extractor, classifier, scoring layers, dense layers) ingest the resulting augmented call data. In some cases, the analytics server 102 generates simulated training data corresponding to training calls having varied features or characteristics (e.g., spoofed metadata), simulating various types of data manipulation or spoofing, or other degradations on other portions of the call data (e.g., degrading call audio data). The server generates an augmented copy dataset corresponding to the training calls. When the analytics server 102 applies and executes software routines of a data augmentation operation on a particular call data, the analytics server 102 generates corresponding simulated call data as an augmented copy of the particular training call data of the training call. Non-limiting examples of the pre-processing operations executed on the input audio signals include parsing or segmenting the input audio signal into frames or segments (e.g., speech segments of a given length, non-speech segments of a given length), performing one or more transformation functions (e.g., FFT, SFT), and extracting various types of features from the input audio signal, among other potential pre-processing operations.

The input layers or layers of the embedding extraction engine (sometimes referred to as "embedding extractor") extract various types of features representing aspects of the input data (e.g., training call data, enrollment call data, inbound call data). The features may include certain types of telephony-related metadata for the caller device 114, behavioral measures of the caller's operation of the caller device 114, behavioral measures of the caller's interactions with the telephony networks 130, behavioral measures of the caller's interactions with the provider system 110, and low-level acoustic features representing audio data, among other features representing aspects of the call, the caller, or the caller device 114.

Using the features extracted from the call data, the layers defining the embedding extractor generates various types of embedding feature vectors. As an example, the machine-learning architecture generates a deviceprint representing device-related features, which the machine-learning architecture uses to generate a device recognition score indicating the likelihood the inbound caller device 114 is an expected caller device 114. As another example, the machine-learning architecture generates a behaviorprint representing caller behavior features, which the machine-learning architecture uses to generate a behavior risk or fraud risk score, indicating the likelihood that the caller is an expected caller or the inbound call is fraudulent. As another example, the machine-learning architecture generates a spoofprint representing spoof-related features, which the machine-learning architecture uses to generate a spoofing likelihood score, indicating the likelihood that the current inbound call is spoofed based upon known or likely spoofed metadata. As another example, the machine-learning architecture generates a fraudprint representing fraud-related features, which the machine-learning architecture uses to generate a fraud risk score, indicating the likelihood the inbound call is fraudulent. As another example, the machine-learning architecture generates a voiceprint representing caller speech features, which the machine-learning architecture uses to generate a speaker recognition score indicating the likelihood the inbound caller is an expected caller. The machine-learning architecture may extract and generate any number of additional or alternative types of features, feature vectors, and risk scores.

The layers of the embedding extractor, or other aspects of the machine-learning architecture, include scoring layers that generate the one or more risk scores for the call. Non-limiting examples include a risk score, a device recognition score, a spoofing score, a speaker recognition score, and a fraud-risk score, among other types of risk-related scores. The feature extraction engine and embedding extraction engine extract features for the call data and feature embedding vectors using the input data of the call, based on the type of risk score generated by the machine-learning architecture.

In some embodiments, the machine-learning architecture comprises a feature extraction engine trained for jointly extracting features used downstream for generating two or more risk scores by any number of embedding extraction engines. Likewise, the machine-learning architecture may comprise an embedding extraction engine trained for jointly generating two or more types of risk scores using the features extracted from one or more feature extraction engines.

In some embodiments, the machine-learning architecture comprises distinct feature extraction engines for separately extracting feature sets used downstream for generating two or more risk scores by any number of embedding extraction engines. Similarly, the machine-learning architecture may comprise distinct embedding extraction engines trained for jointly generating two or more types of risk scores using the features extracted from one or more feature extraction engines. For example, a first feature extraction engine or first embedding extraction engine extracts a first set of features and first vector needed for the first embedding extraction engine to generate a device recognition score. In this example, a second feature extraction engine or second embedding extraction engine extracts a second set of features and second vector needed for the second embedding extraction engine to generate a spoofing score.

The analytics server 102 may execute a machine-learning architecture comprising various software-based processes of layers and functions. The layers and functions executed by the analytics server 102 define various functional engines, such as input layers, embedding extraction engine ("embedding extractor"), and scoring engines, among others. In operation, the components of the machine-learning architecture perform operation including, for example, ingesting the call data of a current or inbound telephone call originated by the caller device 114, querying one or more databases 104, 106, 108 for additional data related to the caller device 114, applying and executing software of the machine-learning architecture on the call data to generate one or more risk scores, and reporting a risk assessment message containing the one or more risk scores to the provider system 110. At a time prior to transmitting the risk assessment message to the provider system 110, the analytics server 102 removes (or otherwise obfuscates) the caller ANI from any data, information, or message sent to the provider system 110.

The analytics server 102 executes the software programming of the machine-learning architecture in various operational phases, including a training phase, a deployment phase (sometimes referred to as a "testing" or "inference" phase), and an optional enrollment phase. The analytics server 102 may enable or disable various functions, layers, or functional engines of the machine-learning architecture according to the particular operational phase (e.g., training, enrollment, deployment). For instance, the analytics server 102 enables and applies and executes software routines of various classifier layers of the embedding extractor during the training phase, and disables the classifier layers of the embedding extractor during the deployment phase. The analytics server 102 or other computing device (e.g., terminating carrier core 124) of the system 100 applies and executes software routines of the machine-learning architecture on input data according to the particular operational phase. For instance, the input data includes training data during the training phase, enrollment data during the enrollment phase, and current or inbound data during the deployment phase. The input data contains, for example, audio data or signaling data (e.g., SIP protocol metadata).

Input layers of the machine-learning architecture, the analytics server 102, or other computing device (e.g., terminating carrier core 124) of the system 100 performs various pre-processing operations and/or data augmentation operations on the input data based on the operational phase. Non-limiting examples of the pre-processing operations on the input data include parsing the audio data into fixed frames or sub-frames; transforming the audio data from a time-domain representation into a frequency-domain representation according to an FFT of SFT algorithm; or performing normalization or scaling functions; among other potential pre-processing operations. Moreover, non-limiting examples of the data augmentation operations include performing flip signal augmentation; performing bandwidth expansion; down-sampling or up-sampling; audio clipping; noise augmentation; frequency augmentation; and duration augmentation; among other potential data augmentation operations.

In some cases, the analytics server 102 may perform one or more pre-processing or data augmentation operations prior to feeding the input data (e.g., training data, enrollment signal data) into the input layers of the machine-learning architecture. In some cases, additionally or alternatively, the analytics server 102 executes one or more pre-processing or data augmentation operations when executing the machine-learning architecture, where the input layers (or other layers) of the machine-learning architecture perform the pre-processing or data augmentation operations. For example, in these cases, the machine-learning architecture comprises "in-network" input layers and/or data augmentation layers that perform the pre-processing operations and/or data augmentation operations on the input data fed into the machine-learning architecture. The data augmentation operations generate various types of distortion or degradation of the input data, such that the operational layers of the machine-learning architecture (e.g., embedding extractor; classifier, scoring layers) ingest the resulting augmented or distorted input audio signals for training. In some cases, the analytics server 102 generates simulated training audio signals corresponding to training audio signals having varied features or characteristics (e.g., variations on the speaker's voice characteristics), thereby simulating the various types of degradations. The analytics server 102 generates an augmented copy dataset corresponding to the training data. When the analytics server 102 applies and executes software routines of the data augmentation operation on a particular input data, the analytics server 102 generates corresponding simulated data as an augmented copy of the particular input data.

The analytics server 102 executes software program functions or machine-learning architecture layers that execute feature extraction functions for the embedding extractor, such as the input layers defined by the layers of the machine-learning architecture. Feature extraction functions ingest the input data (e.g., call data, audio signal) containing, for example, SIP signaling metadata or biometric data associated with the caller's speech. The input data may include training call data, enrollment call data, or inbound call data, according to the particular operational phase of the machine-learning architecture. The analytics server 102 receives the input data containing metadata associated with the caller device 114 from the terminating carrier 120, the third-party database 108, or the provider server 111, and extracts various types of features from the input data. The feature extraction functions of the embedding extractor may extract various types of features from the input call data, such as device-related features indicating the particular caller device 114 or speaker features indicating the caller's speech.

The input layers of the embedding extractor may extract or receive the various types of features for the particular input data. The input layers then feed the extracted features into the layers of the embedding extractor. Using the extracted features, the embedding extractor then extracts one or more types of feature vector embeddings (e.g., "deviceprint," "behaviorprint," "voiceprint," "spoofprint"). The embedding vector is a mathematical representation of, for example, the caller device 114 ("deviceprint"), caller ("voiceprint," "behaviorprint"), or expected or recognized form of fraud ("spoofprint"). In operation, the feature extraction functions extract the features from the call data, and the analytics server 102 applies and executes software routines of the embedding extractor on the features to derive the particular embedding(s).

During training operations of the analytics server 102, the input layers of the machine-learning architecture perform the feature extraction functions on training data to extract the device-related features of a caller device 114 or caller. The embedding extractor extracts one or more training embedding feature vectors (e.g., training deviceprint, training spoofprint) based on the inbound features extracted from the training data. In some instances, the analytics server 102 performs the various data augmentation operations on the training data to generate simulated training samples, from which the input layers extract the various features and the embedding extractor then generates the training embedding vector(s). The analytics server 102 executes programming for generating predicted outputs. The predicted outputs may include, for example, determining the similarity score based upon the distance (e.g., cosine distance), or other algorithm, between the training embeddings and the corresponding expected embeddings indicated by training labels or known data from one or more databases. The predicted outputs may also include, for example, determining a likelihood score for one or more predicted risk scores or classifications of the caller device 114 based upon the distance or correctness of the predicted risk scores classifications of the caller device 114 compared to expected risk scores or classifications of the caller device 114 as indicated by the training labels. The predicted outputs may include any number of additional or alternative potential outputs generated by the machine-learning architecture. Loss layers and backpropagation functions of the machine-learning architecture adjust various hyper-parameters, weights, or other aspects of the machine-learning architecture to improve the accuracy and precision of the predicted outputs, until the analytics server 102 determines that the machine-learning architecture satisfies one or more training thresholds. During the training phase for the machine-learning architecture, the analytics server 102 receives training data various lengths and characteristics from one or more corpora, which may be stored in the analytics database 104 or other machine-readable non-transitory storage medium of the system 100.

The analytics server 102 may retrieve the simulated training data from the more analytics databases 104 and/or generate the simulated training data by performing various data augmentation operations. In some cases, the data augmentation operations may generate a simulated call data for the given input data (e.g., training data, enrollment data), in which the simulated data contains manipulated features of the given input data mimicking the effects a particular type of data degradation, distortion, or fraud. The analytics server 102 stores the training data into the non-transitory medium of the analytics server 102 and/or the analytics database 104 for future reference or operations of the machine-learning architecture.

In training, one or more fully connected layers, feed-forward layers, classifier layers, or the like, may generate one or more predicted outputs (e.g., predicted vectors). Loss layers of the machine-learning architecture perform various loss functions to calculate and evaluate the distances between the predicated outputs and corresponding expected outputs, as indicated by training labels associated with the training signal data. The loss layers (or other functions executed by the analytics server 102) adjust or tune the hyper-parameters of the machine-learning architecture until the distance between the predicted outputs and the expected outputs satisfies a training threshold value. The analytics server 102 determines that the machine-learning architecture is successfully trained, in response to the analytics server 102 determining that the distance between the predicted outputs and the expected outputs satisfies the training threshold.

During optional enrollment phase of the machine-learning architecture, the analytics server 102 registers a new caller and enrolls one or more caller devices 114 using data about the caller device 114 or the caller. The analytics server 102 places the machine-learning architecture in the enrollment phase. The analytics server 102 applies and executes software routines of the input layers and the embedding extraction engine on the enrollment data for the caller device 114, thereby extracting the particular enrollment features and the enrollment embedding vector for enrolling the caller device 114 and the caller. In later deployment phases, the machine-learning architecture compares an inbound embedding vector (e.g., inbound or observed deviceprint; inbound or observed spoofprint) against the corresponding enrolled embedding vector (e.g., enrolled or expected deviceprint; enrolled or expected spoofprint) to determine the one or more risk scores. In some cases during registration, the embedding extractor extracts multiple enrollment speaker embeddings for multiple enrollment samples (e.g., a plurality of device-related feature vectors extracted from device-related data for the caller device 114), which the analytics server 102 then algorithmically combines (e.g., averages, concatenates, convolves) to generate the enrolled embedding vector (e.g., enrolled deviceprint) representing the caller device 114.

During the deployment phase of the machine-learning architecture, the analytics server 102 applies and executes software of the machine-learning architecture on the current inbound data for the caller device 114. The input layers or the embedding extractor of the trained machine-learning architecture perform the feature extraction functions on the inbound call data to extract the various types of features of the caller device 114 or the caller from the caller device 114. The embedding extractor extracts one or more inbound embedding feature vectors (e.g., inbound deviceprint, inbound spoofprint) based on the extracted inbound features. In some instances, the analytics server 102 algorithmically combines (e.g., averages, concatenates, convolves) one or more inbound feature vectors (as extracted from the inbound contact data) to generate the one or more inbound embeddings. The analytics server 102 executes programming for determining similarity scores based upon a distance (e.g., cosine distance), or other algorithm, between the inbound embeddings and the corresponding expected embeddings or enrolled embeddings.

The machine-learning architecture need not generate the enrollment vector(s) using enrollment data during an enrollment phase. In some implementations, during the deployment phase, the analytics server 102 retrieves data from a third-party database 108 and uses the telephony data to determine the one or more risk scores based upon comparing the telephony data against the inbound call data received from the caller device 114. In some implementations, during the deployment phase, the analytics server 102 applies and executes software of the machine-learning architecture on the telephony data retrieved from the third-party database 108 to extract the set of features and, using the extracted features, extract one or more enrollment or expected vectors. The machine-learning architecture generates the one or more one or more risk scores based upon the similarity or difference (e.g., cosine distance) between the inbound vector(s) and the expected vector(s) extracted from the telephony data from the third-party database 108.

In operation, the analytics server 102 receives the inbound call data from the terminating carrier core 124 and extracts the one or more inbound embedding vectors representing aspects of the call data, the caller device 114, or the caller. The terminating carrier 120 further routes the call to the provider system 110. A provider server 111 of the provider system 110 then transmits a risk assessment request to the analytics system 101. In certain circumstances (e.g., caller request to the telephony network(s) 130), the provider system 110 never receives the caller ANI from the terminating carrier 120 or the analytics system 101. As such, the risk assessment request contains the unique identifier or tracking identifier that indicates the caller device 114 or the call and may not contain the caller ANI. The analytics server 102 receives the risk assessment request from the provider system 110 and returns a risk assessment message. The risk assessment message includes various types of information about the caller device 114, caller, or call, such as the one or more risk scores and various types of metadata about the caller device 114, caller, or call, exclusive of the caller ANI.

As shown in FIG. 1, the data vendor 106 includes the third-party database 108 that stores information about, for example, portability data about the caller ANI or calling devices 114, among other types of data. The third-party database 108 may store various types of telephony data or portability data associated with the particular caller devices 114. Non-limiting examples of such portability data includes the caller carrier or Carrier Identification Code (CIC), country or country code, charge number or billing number, last-ported date, and line type, among other types of SIP-protocol data. In some embodiments, the analytics system 101 may comprise an additional or alternative telephony database 108. For example, the analytics system 101 may host a telephony database 108, or other database (e.g., analytics database 104), configured to store cached metadata associated with Caller IDs or caller ANIs frequently observed by the analytics service 101, originating carrier 116, terminating carrier 120, or provider system 110.

The call analytics system 101 may query the third-party database 108 according to one or more caller identifiers values, such as the caller ANI or a unique caller identifier assigned to the caller device 114 by the analytics system 101 or the terminating carrier 120. The analytics server 102 queries information stored in the third-party database 108 to identify and select a unique caller identifier, which the data vendor 106 and third-party database 108 returns the data when exchanging data or reporting risk scores with the provider system 110. In this way, the functions of the analytics system 101 maintain secrecy of the caller ANI, inhibiting disclosure of the caller ANI to the provider system 110.

The provider system 110 (e.g., enterprise call center) comprises provider servers 111, provider databases 112, and agent devices 113, and among other potential computing devices. The computing devices of call centers 110 collect call data generated during phone calls received from the caller devices 114 and risk scores generated by the analytics system 101. Additionally or alternatively, the call data collected or received by the provider system 110 may be stored into the provider database 112 or the provider server 111 or perform various analytics processes. It should be appreciated that the provider server 111, the provider database 112, and the agent device 113 may each include, or be hosted on, any number of computing devices comprising a processor and software capable of performing various processes described herein.

The provider server 111 of the provider system 110 performs certain processes for forwarding risk assessment requests to the analytics system 101 and handling the calls based upon the scoring results, caller information, or other determinations returned from the analytics server 102. In some cases, the provider server 111 captures the call data associated with calls made to the provider system 110 and includes certain types of call data in the requests sent to the analytics system 101. In some cases, the customer server 111 sends the risk assessment request to the analytics system 101 according to preconfigured triggering conditions (e.g., in response to the terminating carrier 120 routing a call to the provider system 110).

In some embodiments, the customer server 111 may host and execute software processes and services for managing a call queue and/or routing calls made to the provider system 110, which may include routing calls to an appropriate agent device 113 of a call center agent. The provider server 111 may provide information about the call, caller, and/or calling device 114 to an agent device 113 of the call center agent. A graphical user interface of the agent device 113 displays certain information to the call center agent, including the one or more risk scores received from the analytics system 101 and information about the call, caller, and/or calling device 114.

An agent device 116 of the customer call center system 110 allows end-users of the provider system 110 (e.g., call center agents, administrative users) to configure operations of the devices of the provider system 110. For the calls made to the provider system 110, the provider server 111 routes calls from the terminating carrier 120 to particular agent devices 113. The agent device 113 receives some or all of the call data associated with the particular call. The agent device 113 may store call data into a customer database 113 or display call data to the agent via the graphical user interface of the agent device 113.

In some implementations, the agent device 113 generates labels for the calls (or certain call data of particular calls) as being "fraudulent" or "non-fraudulent." In some cases, the agent device 113 generates a label in response to instructions entered by the agent via the graphical user interface of the agent device 113. In some cases, the agent device 113 automatically generates a label in response to the one or more risk scores received from the analytics system 101. The agent device 113 stores such labeled call data into the customer database 112 or forward the labeled call data to the analytics system 101.

A provider database 112 of the customer call center system 110 stores call data received from a caller device 114, provider server 111, agent device 113, analytics server 102, originating carrier 116, or terminating carrier 120. The provider database 112 returns various types of data to the provider server 111 or agent device 113 in response to instructions, queries, or pre-configured triggering conditions (e.g., receiving new call data, predetermined time interval).

Figure 2A:
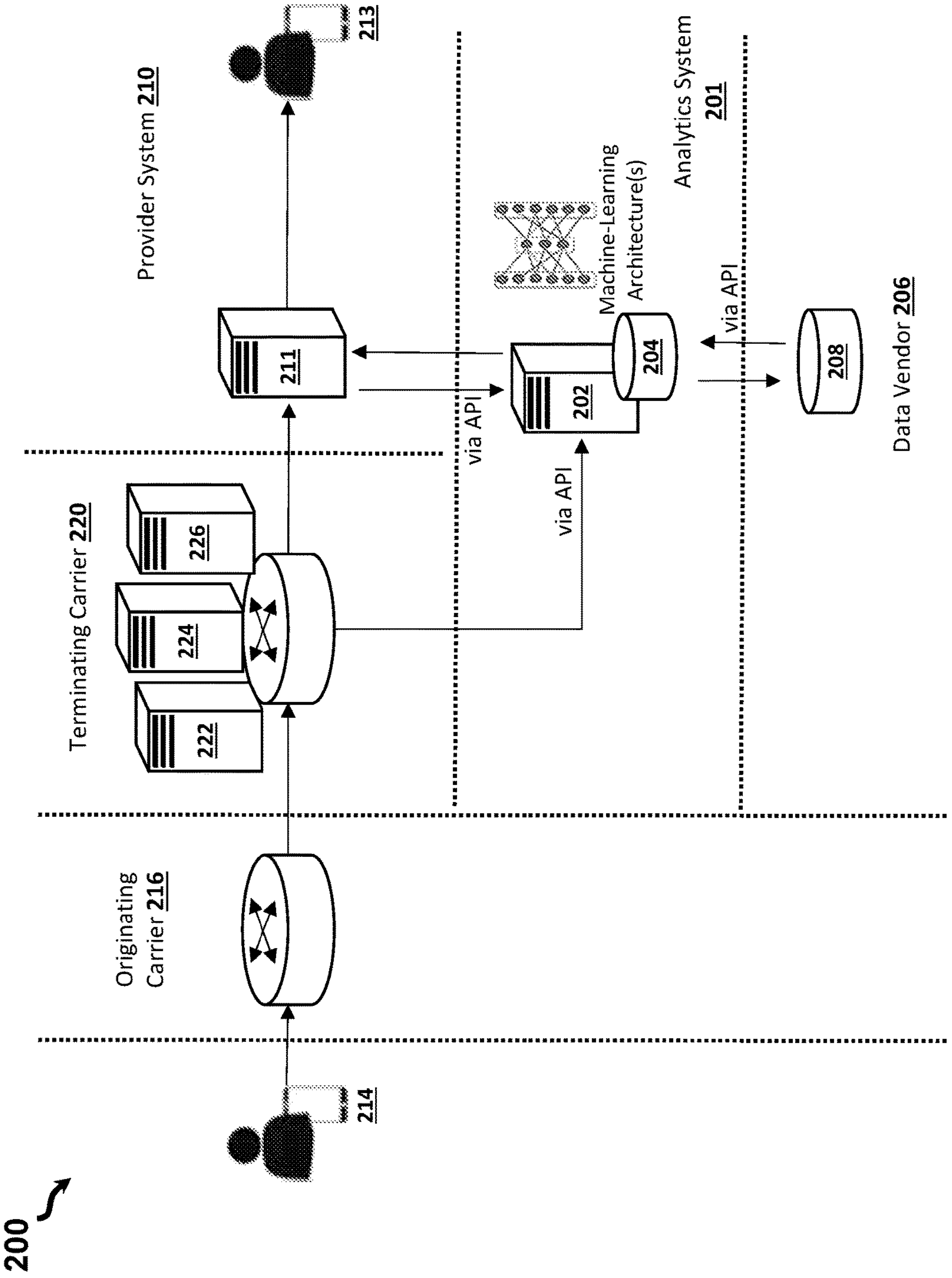
FIG. 2A shows data flow among components of a system for risk-scoring and authentication using inbound call data on behalf of provider systems, according to an embodiment.

FIG. 2A shows data flow among components of a system 200 for risk-scoring and authentication using inbound call data on behalf of provider systems 210. The system 200 includes an analytics system 201, one or more provider systems 210, an originating carrier 216, and one or more terminating carriers 220. The system 200 further includes any number of end-user caller devices 214 (e.g., caller devices 114*a*-114*d*).

The caller device 214 sends an outbound call with a telephony protocol message (e.g., SIP INVITE message) to an originating carrier 216 that services the caller device 214. The new call request message includes telephony protocol metadata for handling or routing the call, including a caller ANI, DNIS, and destination ANI for a provider system 210. The SBC (or other device) of the originating carrier 216 receives the call message from the caller device 214 and routes the call to the terminating carrier 220 that services the provider system 210, according to the destination ANI or other metadata. The terminating carrier 220 receives the call at an ingress SBC 222 of the terminating carrier 220. Components (e.g., routers, switches, computing devices) of a terminating carrier core 224 of the provider system 210 route the call to an egress SBC 226 and to the analytics system 201.

The carrier core 224 receives the call data (e.g., metadata, call audio data) of the call, as forwarded from the originating carrier 216 by the ingress SBC 222. The carrier core 224 extracts certain types call data from a header of the telephony protocol message and forwards the call data to the analytics system 201. The terminating carrier core 224 identifies or generates a unique caller identifier for the caller device 214. The analytics server 202, the terminating carrier 220, and the provider system 210 use the unique caller identifier to exchange information about the new call, thereby obscuring the caller ANI from the provider system 210.

The analytics server 202 stores the call data into an analytics database 204. The analytics server 202 may retrieve the call information from the analytics database 204 when generating the one or more risk scores for the analytics system 201. The analytics database 204 may query the analytics database 204 for the call data using the unique caller identifier (or another type of identifier). In some embodiments, the analytics server 202 stores the call tracking identifier into the database record for the call (or database records for sets of calls) received from the caller device 214. In some cases, a provider server 211 generates and supplies the customer identifier and/or the tracking identifier to the analytics server 202. Additionally or alternatively, the analytics server 202 generates the customer identifier and/or the tracking identifier. In operation, the terminating carrier core 224 or the analytics server 202 identifies a call tracking identifier associated with the particular call or caller device 214 when storing the call data into the analytics database 204. In some cases, the provider server 211 or the analytics server 202 generates and references a hash of the tracking identifier and/or the unique caller identifier. As an example, the analytics system 201 stores, into the analytics database 204, the SIP INVITE message (or other forms of call data), the unique customer identifier, and the tracking identifier.

The analytics server 202 returns a message (e.g., SIP response) to the computing device of the terminating carrier core 224, indicating whether the analytics server 202 successfully received and stored the call data or whether the analytics server 202 experienced an exception. For example, the analytics server 202 generates and returns a SIP response message containing a SIP response code (e.g., "202_Accepted") and the tracking identifier or the unique caller identifier.

The terminating carrier core 224 routes the call to the egress SBC 226 according to the call data (e.g., destination ANI of the provider system 210). The egress SBC 226, in turn, routes the call to the provider system 210 using the call data. The call data routed to the provider system 210 includes various types of metadata (e.g., SIP header metadata). The call data includes, for example, the unique caller identifier and/or the tracking identifier, but the call data provided to the provider system 210 excludes the caller ANI.

The provider server 211 executes software for queuing, handling, and routing inbound calls. The provider server 211 queues the call and stores the call data and transmits a risk assessment request to the analytics system 201. The risk assessment request instructs the analytics server 202 to execute various algorithmic functions for generating one or more risk scores for the call. The risk scores include, for example, a call risk score, device recognition score, speaker recognition score, and spoofing score, among others.

The analytics server 202 executes the various analytics operations for generating the one or more risk scores, in response to the analytics server 202 receiving the risk assessment request from the provider server 211. The risk assessment request includes the unique caller identifier or the tracker identifier that indicates the particular call or caller device 214 associated with the particular risk assessment request. The analytics server 202 references the unique caller identifier or the tracking identifier in the risk assessment request to query the analytics database 204 and retrieve the call data for the particular call.

The analytics server 202 extracts the metadata header or other data from the new call message (e.g., extracts SIP header from SIP INVITE). The analytics server 202 further extracts the phone number portions of the metadata. These phone number metadata fields indicate the caller (e.g., caller ANI, CLI, P-CLI), the network (e.g., N-CLI), or diversion (redirecting) number(s) for the particular call.

In addition, the analytics server 202 transmits a third-party data request to a data vendor 206. The third-party data request instructs the data vendor 206 to query a third-party database 208 for various types of telephony data about the caller device 214. For example, the analytics server 202 transmits the third-party request to the data vendor 206 in order to query the third-party database 208 for various types of data (e.g., portability data in portability database) about the caller device 214, which indicates, for example, the caller carrier, CIC, country or country code, and last-ported date, and the like.

The analytics server 202 executes the risk assessment functions using the call data received from the terminating carrier core 224 and the telephony data returned from the third-party database 208. The analytics server 202 generates the one or more risk scores by determining an amount of similarity or difference between expected data and observed data from the call. In some cases, the expected data includes various types of data about the caller or the caller device 214, previously stored into and retrieved from the analytics database 204, third-party database 208, provider database (not shown), or other data source(s). Additionally or alternatively, in some cases, the expected data includes one or more feature vector embeddings that mathematically represent various types of feature sets. Non-limiting examples of the embedding vectors include speaker vectors ("voiceprints") representing low-level acoustic features of the caller's speech, device vectors ("deviceprints") representing various aspects of the caller device 214, and behavior vectors ("behaviorprints") representing various aspects of the caller's behavior interacting with the caller device 214 or the provider system 210, among other types of feature vectors.

The analytics server 202 applies and executes software routines of an embedding extraction engine of a machine-learning architecture on input call data (e.g., training data, enrollment data, inbound data) to extract various types of features and feature vectors using the extracted features. In some cases, the analytics server 202 applies and executes software routines of the machine-learning architecture during an enrollment phase to generate the one or more enrolled embeddings, such as an enrolled voiceprint, enrolled deviceprint, or enrolled behaviorprint, which the analytics server 202 stores into the analytics database 204 or provider database (not shown) as the expected data. During a deployment phase, the analytics database 204 generates corresponding inbound vectors using the inbound call data of the inbound or current call (e.g., current voiceprint, current deviceprint, current behaviorprint) as the observed or predicted data. The machine-learning architecture then determines the risk score as the similarity or difference (e.g., cosine distance) between the enrolled embedding vector of the expected data compared against a corresponding inbound embedding vector of the observed data.

As an example, the analytics server 202 executes the machine-learning architecture to generate an enrolled deviceprint for the caller device 214. The analytics server 202 applies and executes software routines of the machine-learning architecture on the device-related metadata of one or more prior calls for the caller device 214 received from the provider server 211 and/or the device-related data stored in the third-party database 208. The analytics server 202 executes the machine-learning architecture to generate a current deviceprint for the current call or current caller device 214. The analytics server 202 applies and executes software routines of the machine-learning architecture on the current call data of the inbound call to generate the inbound deviceprint and/or the device-related data received from the third-party database 208. The analytics server 202 determines a device-recognition score based upon the distance between the enrolled deviceprint and the current deviceprint, indicating the similarity or different between the enrolled device and the current caller device 214.

The analytics server 202 may generate an overall or general fraud risk score for the call data. The analytics server 202 generates the fraud risk score based upon various types of features indicative of fraud, as extracted from the call data. In some cases, the analytics server 202 generates the fraud risk score based upon an amalgam of various expected embedding vectors compared against an amalgam of various observed embedding vectors. In some cases, the analytics server 202 determines the fraud risk score by algorithmically combining other risk scores. The analytics server 202 may generate the fraud risk score using any number of algorithms using observed features and expected features.

The analytics server 202 need not generate and implement enrollment vectors. In some embodiments, the analytics server 202 generates a feature vector using the data received from the third-party database 208 as the expected data and generates a feature vector using the call data received for the caller device 214 as the observed data.

The analytics server 202 returns a risk assessment message to the provider server 211. The risk assessment message includes the one or more risk scores calculated by the analytics server 202 and one or more identifiers (e.g., caller identifier, tracker identifier) associated with the call and the caller device 214. The identifiers of the risk assessment message exclude the caller ANI, obscuring the caller ANI from the provider system 210.

The provider server 211 routes the call the agent device 213 based upon the call data and the risk score(s) of the risk assessment message. In some implementations, the provider server 211 connects the inbound call to the agent device 213 in response to determining that the one or more risk scores satisfy corresponding threshold scores. If the agent device 213 determines that one or more of the risk scores fails the corresponding threshold, then the provider server 211 drops the call or performs other mitigation functions. In some implementations, the provider server 211 connects the inbound call to the agent device 213 in response to instructions entered by the end-user of the provider system 210. For instance, the provider server 211 presents some or all of the information in the threat assessment message at the graphical user interface of the agent device 213. The agent determines whether the risk score(s) are adequate and enters user inputs instructing the provider server 211 to, for example, connect the call to the caller device 214, drop the call, or perform other mitigation operations. In some implementations, the analytics server 202 determines whether one or more of the risk scores satisfy or fail the corresponding threshold scores and includes the determination(s) in the risk assessment message. The provider server 211 connects the call to the caller device 214, drops the call, or performs other mitigation operations based upon the determination(s) of the risk assessment message.

Figure 2B:
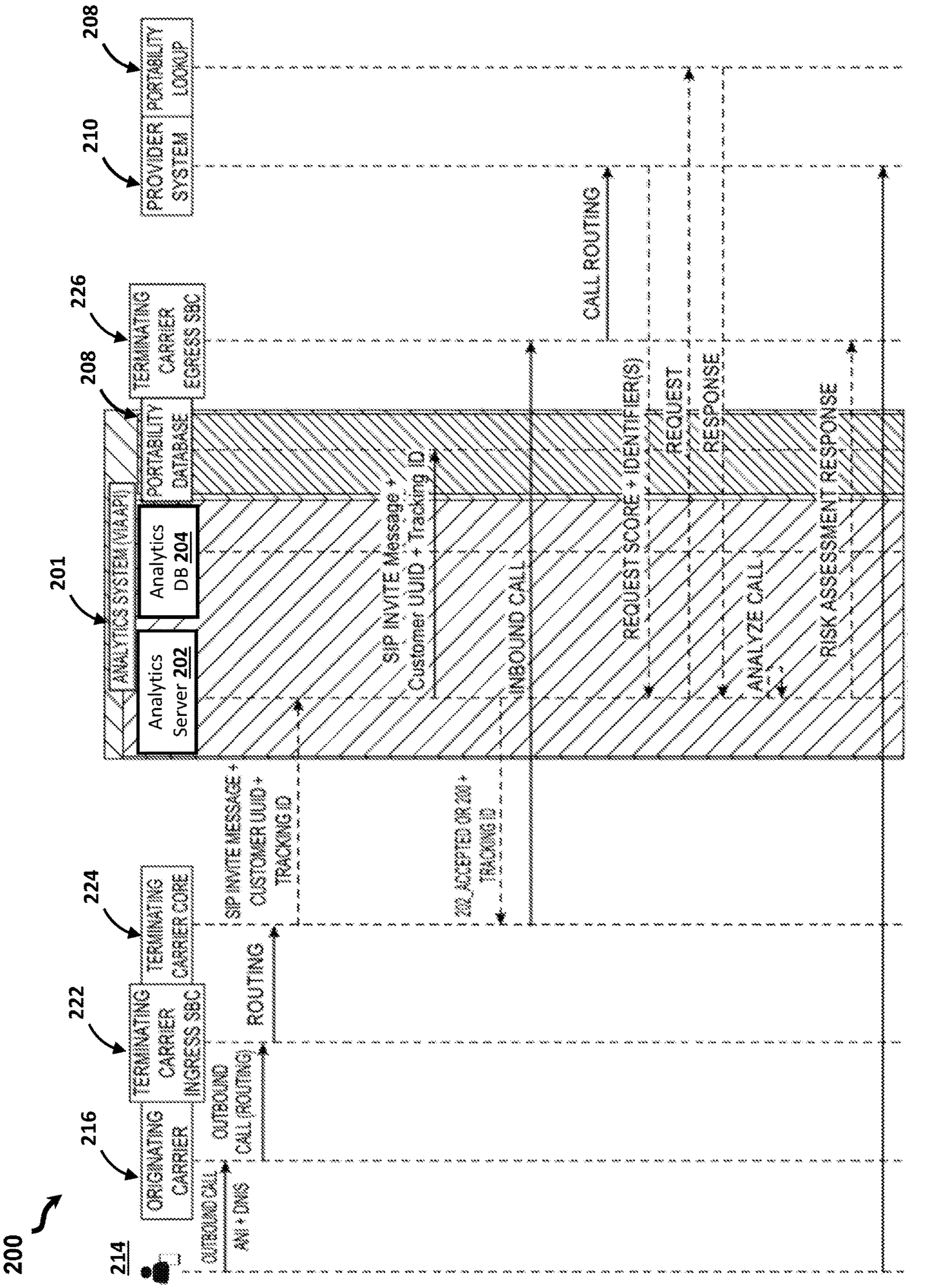
FIGS. 2B-2C show example data flows amongst various components of a system for assessing risk using the inbound call data before routing the incoming call to a provider system, as described in FIG. 2A, according to an embodiment.
Figure 2C:
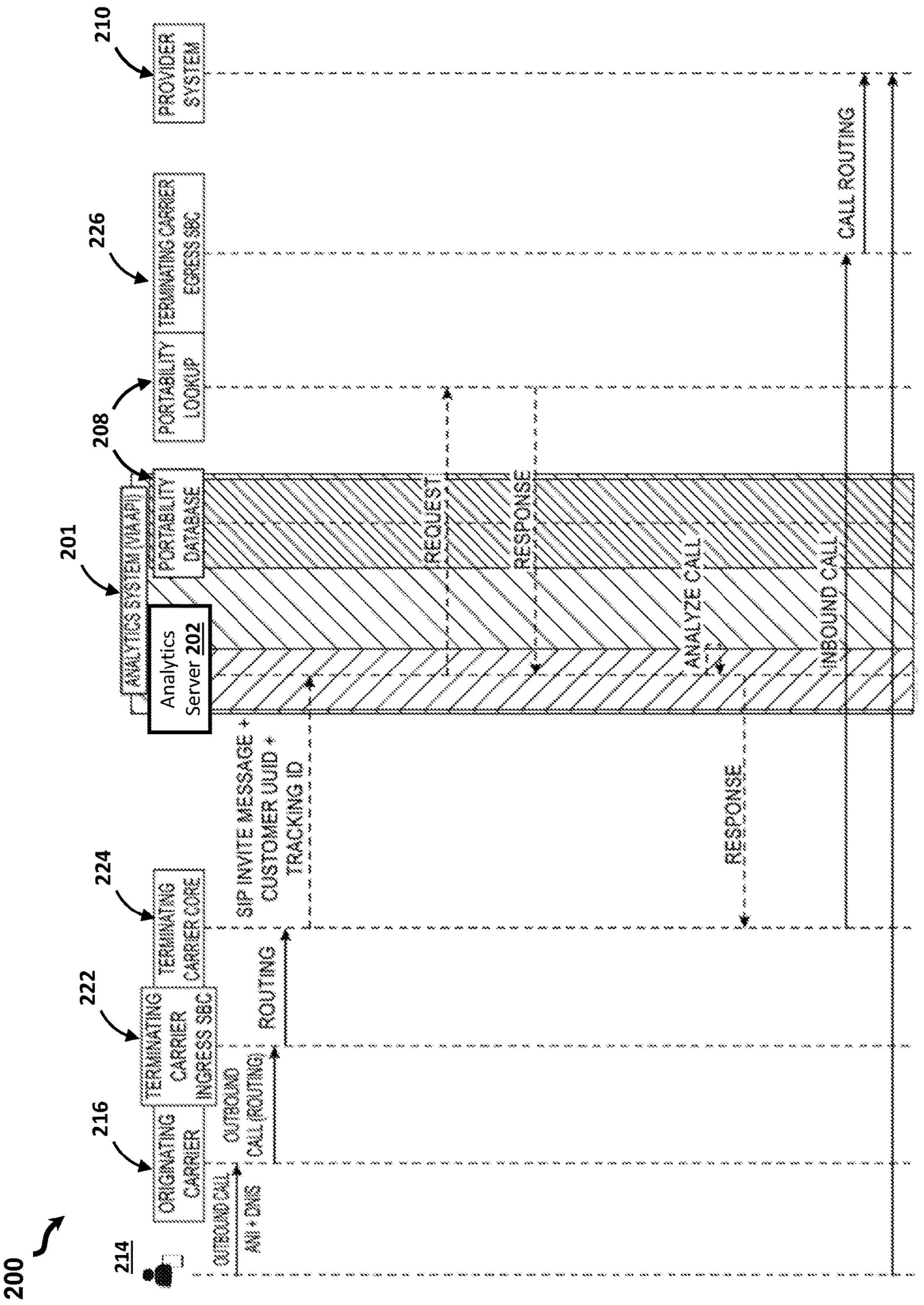

FIGS. 2B-2C show example data flows amongst various components of a system 200 for assessing risk using the inbound call data before routing the incoming call to a provider system 210, as described in FIG. 2A. The components depicted in FIGS. 2B-2C have been described with respect to FIG. 2A, and certain details need not be repeated in the descriptions of the embodiments of FIGS. 2B-2C.

In FIG. 2B, the analytics system 201 references the analytics database 204 and the third-party database 208 or other database containing portability data (shown as a portability database 208) using the inbound call data (e.g., extracted metadata), related to the inbound call (e.g., SIP INVITE message, customer unique identifier, tracking identifier). The analytics server 202 then returns an acknowledgement message according to the telephony protocols (e.g., "202_accepted") and the tracking identifier to the terminating carrier core 224 (or other component of the terminating carrier 220). The terminating carrier core 224 routes the inbound call to the egress SBC 226, which may route the inbound call to the provider system 210. The provider system 210 may return a score request to the analytics server 202, which may send a request to the portability database 208 (or other third-party database 208) to perform a portability lookup query, and the portability database 208 returns a response containing the various types of portability data related to the inbound call. The analytics server 202 generates the one or more risk scores associated with the inbound call by executing computing processes that analyze the various forms of data received, extracted, generated, or otherwise obtained for the inbound call. The analytics server 202 then generates and returns a risk assessment response message containing the one or more risk scores to the terminating carrier SBC 226 and/or to the provider system 210. The analytics server 202 may transmit the risk assessment response message in any number of formats or data types, such as JSON, via one or more APIs.

In this way, in FIG. 2B, the provider system 210 invokes the analytics system 201 to perform the computing processes for analyzing the inbound call and generating the risk score(s), by sending the score request message to the analytics server 202.

In FIG. 2C, the analytics system 210 references the analytics database 204 and the third-party database 208 or other database containing portability data (shown as a portability database 208) using the inbound call data (e.g., extracted metadata), related to the inbound call (e.g., SIP INVITE message, customer unique identifier, tracking identifier). The analytics server 202 may send a request to the portability database 208 (or other third-party database 208) to perform a portability lookup query, and the portability database 208 returns a response containing various types of portability data related to the inbound call. The analytics server 202 generates the one or more risk scores associated with the inbound call by executing the computing processes that analyze the various forms of data received, extracted, generated, or otherwise obtained for the inbound call. The analytics server 202 then returns an acknowledgement message (or other form of response message) to the terminating carrier core 224. This response message includes the one or more risk scores generated by the analytics server 202 and may include additional types of data according to the telephony protocols. In some cases, the analytics server 202 may transmit the one or more risk scores to the terminating carrier core 224 in any number of formats or data types, such as JSON, via one or more APIs. The terminating carrier core 224 may reject or drop the inbound call based upon the one or more risk scores. Alternatively, the terminating carrier core 224 may route the inbound call to the terminating carrier egress SBC 226, which may route the inbound call to the provider system 210. The terminating carrier core 224 and the egress SBC 226 may also send the one or more risk scores to the provider system 210 in addition to routing the inbound call.

In this way, in FIG. 2C, the provider system 210 need not invoke the analytics system 201 to perform the computing processes for analyzing the inbound call and generating the risk score(s).

Figure 3:
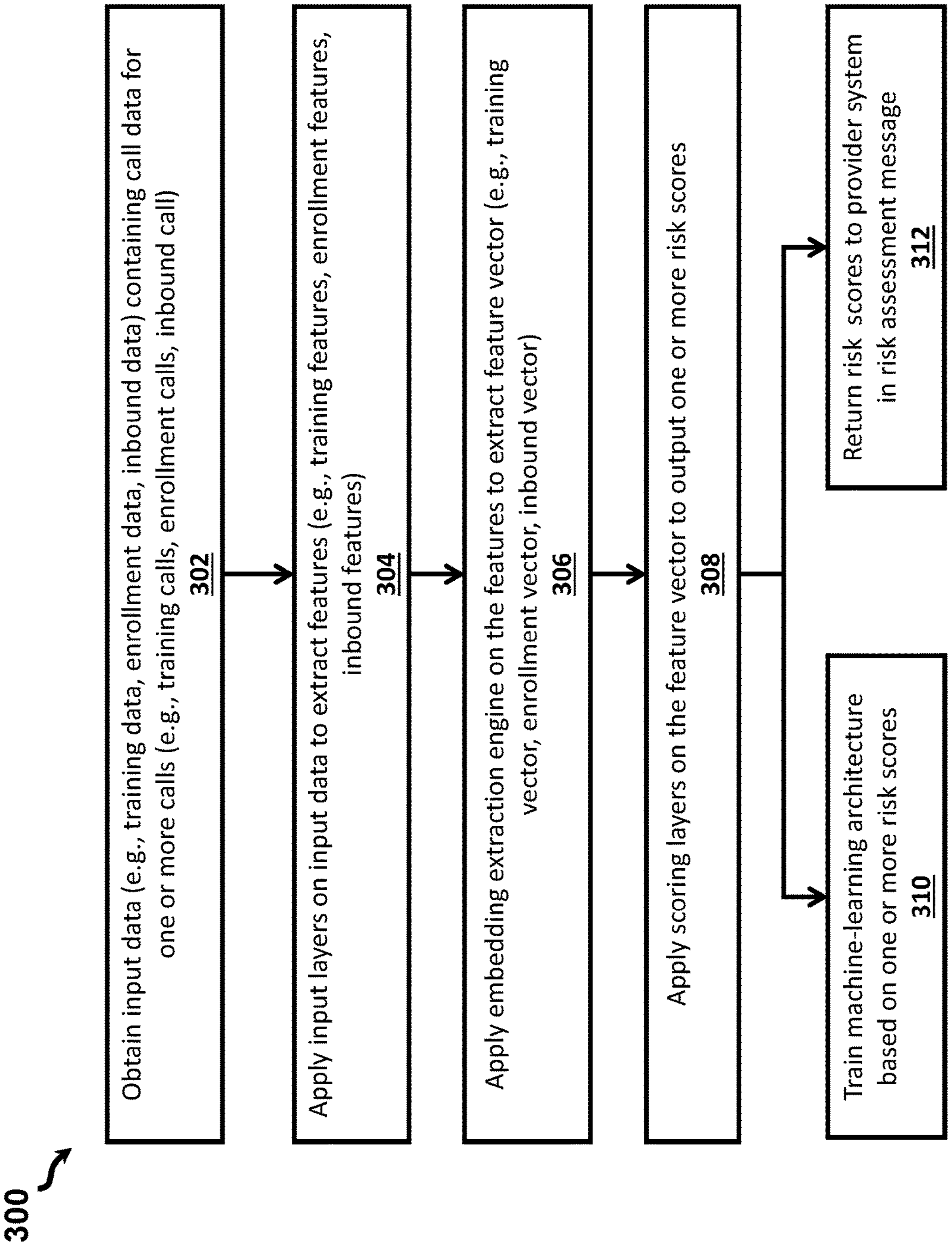
FIG. 3 shows execution operations of a method during various operational phases of applying executable software programming of a machine-learning architecture for assessing risk of calls without exposing a caller ANI to a call destination system or device, according to an embodiment.

FIG. 3 shows execution operations of a method 300 during various operational phases of applying executable software programming for a machine-learning architecture for assessing risk of calls without exposing a caller ANI to a call destination system or device. A server (or other computing device) executes programming of a machine-learning architecture according to certain operational phases, including a training phase, an optional enrollment phase, and a deployment phase. During each of the operational phases, the machine-learning architecture receives various types of input data (e.g., training data, enrollment data, inbound data).

In operation 302, the server obtains the input data (e.g., training data, enrollment data, inbound data) containing call data for one or more calls (e.g., training calls, enrollment calls, inbound call). The server receives the training data from one or more corpora of prior or training calls, stored in one or more databases. In some cases, the server executes data augmentation operations on training data to generate simulated training data, which the server includes with the other training data. The server receives the enrollment data from a provider database or analytics database, where the provider server or the server generates or collects the enrollment data during the optional enrollment phase. In some cases, the server receives the enrollment data from a third-party telephony database, by retrieving the telephony-data associated with the caller ANI (or other identifier of the caller device) from the third-party telephony database. During the deployment phase, the server receives the inbound call data from a terminating carrier that services, handles, and routes calls for the destination provider system. In some cases, the server receives the inbound data from the third-party telephony database, by retrieving the telephony-data associated with the caller ANI (or other identifier of the caller device) from the third-party telephony database.

In operation 304, the server applies and executes software routines of input layers of the machine-learning architecture on the input data to extract features according to the particular operational phase (e.g., training features, enrollment features, inbound features). Feature extraction functions executed by the server extract the various types of features from the input data in accordance with each type of embedding vector generated by the embedding extraction engine, as defined by the layers of the machine-learning architecture. For instance, the machine-learning architecture may generate deviceprints for determining a likelihood an inbound caller device matches an expected caller device (e.g., device recognition) or spoofprints for determining a likelihood that the inbound call data matches expected patterns of call data for spoofed calls (e.g., spoof detection), among others.

In operation 306, the server applies and executes software of embedding extraction engine on the features to extract feature vector according to the particular operational phase (e.g., training vector, enrollment vector, inbound vector). In training, the server applies and executes software routines of the machine-learning architecture on the training data (e.g., training call data for one or more training calls) received from one or more databases and/or generated by the server. The embedding extraction engine uses the training features extracted from the training data to generate one or more training vectors of various types. In some cases, the server algorithmically combines the training vectors to generate one or more types of training embedding vectors (e.g., training deviceprint, training spoofprint).

Likewise, during the deployment phase, the server applies and executes software routines of a trained version of the machine-learning architecture on the inbound call data for the current inbound call originated from the caller device. The trained embedding extraction engine uses the deployment features extracted from the call data to generate one or more inbound vectors of various types (e.g., inbound deviceprint, inbound spoofprint).

Optionally, during enrollment phase, the server applies and executes software routines of the trained version of the machine-learning architecture on the enrollment data for one or more prior calls or registered data for the trusted caller device. The trained embedding extraction engine uses the features extracted from the enrollment data to generate one or more enrollment vectors of various types. The server algorithmically combines the enrollment vectors to generate one or more types of enrolled embedding vectors (e.g., enrolled deviceprint, enrolled spoofprint).

In some embodiments, the server may retrieve certain types of telephony-data about the caller device from the third-party database. The server queries the third-party database using identifying information about the caller device received in the inbound call data. In some cases, rather than perform an enrollment phase, the server uses the telephony-data as the enrollment or expected data. The server may extract the enrollment features from the telephony-data and, using these extracted features, the server may extract the expected embedding vector(s). The server uses the expected embedding vector(s) in a later scoring operation (as in operation 308) to determine the similarity or different (e.g., cosine distance) between the inbound embedding vector(s) and the corresponding expected embedding vector(s). In some cases, the server references the telephony-data in the later scoring operation (as in operation 308) to evaluate or determine an amount of similarity or difference between the inbound call data compared against the telephony-data returned from the third-party database. Additionally or alternatively, in some cases, the server uses portions of the telephony-data and the inbound call data to extract the inbound embedding vector(s).

In operation 308, the server applies and executes software routines of scoring layers (e.g., classification layers, dense layers) on the feature vector(s) to output one or more risk scores. In some embodiments, the server determines the similarity or difference (e.g., cosine distance) between observed embedding vector(s) and corresponding expected embedding vector(s). The outputs of the scoring layers represent risk scores. In some cases, the server generates a fraud risk score based upon multiple types of vectors. In some cases, the server generates a fraud risk score by algorithmically combining the plurality of risk scores.

In training operation 310, the server trains the machine-learning architecture based on one or more risk scores. During the training phase, the server places the machine-learning architecture into a training operational phase and obtains the training call data and associated training labels corresponding to each training call of the training data (as in operation 302). The server trains layers of the machine-learning architecture defining the embedding extractor by applying the executable software of the embedding extractor on the training data and training labels. For each training call (including any simulated call data), the embedding extractor generates a predicted training embedding vector using the training call data for the particular training call. The server compares the predicted training outputs against expected outputs indicated by the training labels. The server executes one or more loss functions of the machine-learning architecture and updates hyper-parameters or weights of the machine-learning architecture. In some embodiments, the machine-learning architecture includes fused loss layers that collectively train the sub-component engines (e.g., one or more embedding extractors, classifiers, dense layers).

For the embedding extractor, the loss layers perform loss functions that evaluate a level of error by referencing the training labels associated with the training calls, where the training labels indicate expected extractor outputs (e.g., expected training features, expected training vectors) for the corresponding training call data. The training labels include various information indicating, for example, the expected values or features of the expected extractor outputs. The various loss functions (e.g., means-square error loss function) determine the level of error based upon differences or similarities between a predicted extractor output (e.g., predicted training features, predicted training vectors) generated by the embedding extractor and the expected extractor output indicated by the corresponding training label. The loss layers of the embedding extractor may adjust the hyper-parameters of the embedding extractor to improve the level of error until the level of error satisfies a threshold level of error.

When training is completed, the server stores the trained machine-learning architecture, hyper-parameters, or weights, into non-transitory memory of the server or other memory storage location (e.g., analytics database). After training, the server may fix the hyper-parameters and/or weights of the machine-learning architecture. In some cases, the server disables certain layers or functions of the machine-learning architecture, thereby keeping the hyper-parameters and/or weights unchanged.

In deployment operation 312, the server generates one or more risk scores of the inbound call, receives a risk assessment request from the provider system, and returns a risk assessment message containing the one or more risk scores to the provider system. The server determines a risk score based upon a similarity or difference between observed inbound call data and expected or enrolled call data.

Figure 4:
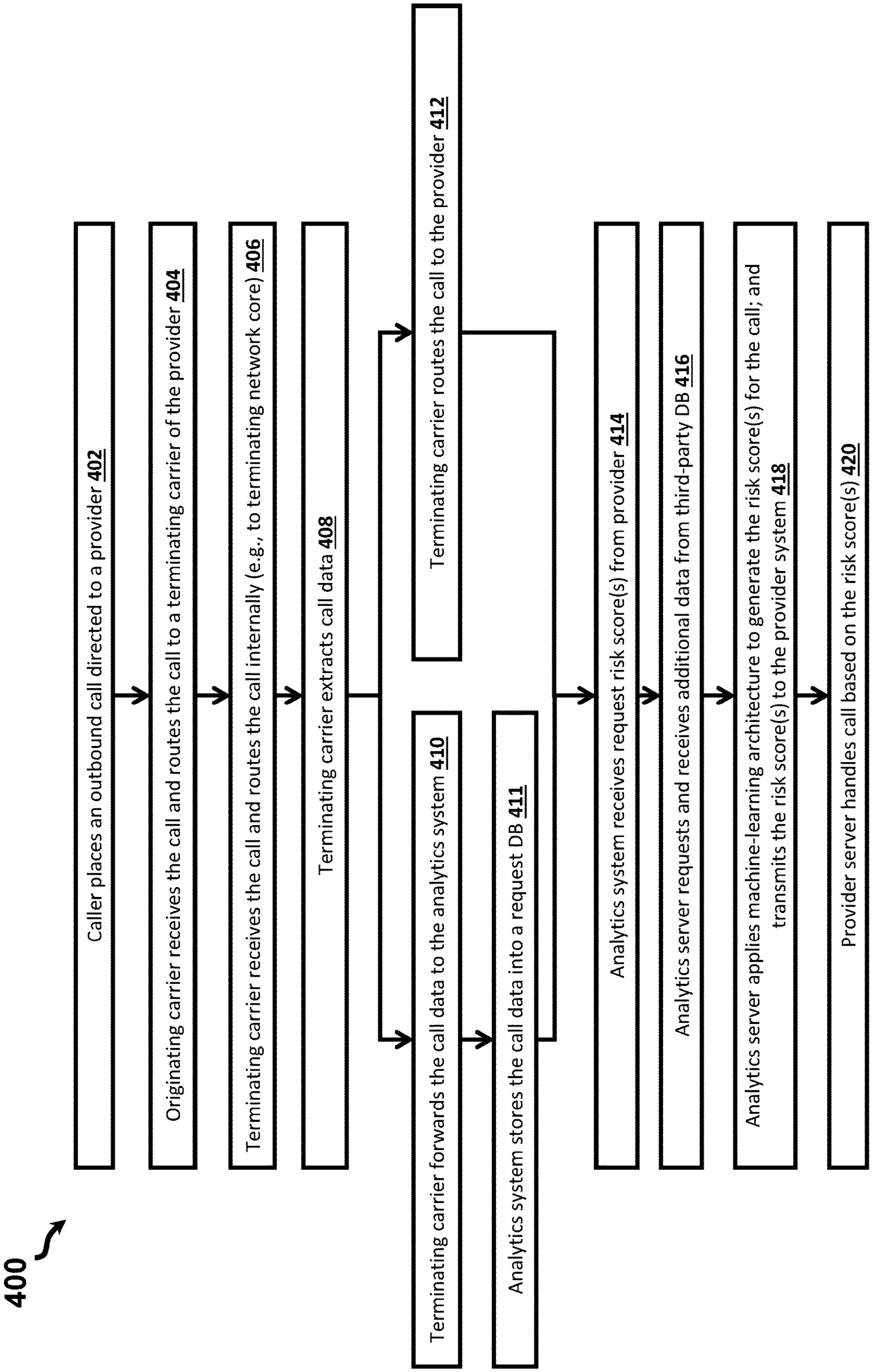
FIG. 4 shows execution operations of a method for handling calls according to call data that obscures a caller ANI from a destination system, according to an embodiment.

FIG. 4 shows execution operations of a method 400 for handling calls according to call data that obscures a caller ANI from a destination system. Other embodiments may include additional, fewer, or different operations depending on the particular arrangement or configuration of component systems.

In operation 402, a caller operates a caller device (e.g., caller device 114) to place a call directed to a destination provider system (e.g., provider system 110), such as an enterprise call center. The provider system includes an enterprise customer of an analytics system. The caller's device and components of one or more telecommunications networks direct the call to an originating carrier (e.g., Vodafone) that services the caller device. The call data includes various types of telephony-related signaling data, such as SIP header metadata. In some cases, the call data includes user inputs (e.g., DTMF tones) entered by the user via the keypad or user interface of the caller device. In some cases, the call data includes audio signal data, such as speech signal data and background noise, among other types of audio data. The call metadata includes, for example, a caller ANI (for the caller device), a provider ANI (for the destination provider system), and other types of identifying information (e.g., DNIS).

In operation 404, the originating carrier of the caller device receives the call and routes the call to a terminating carrier that services the provider. Using call data, the originating carrier directs the call via the telecommunications network to the terminating carrier that services the called provider.

In operation 406, the terminating carrier receives the call (routed from the originating carrier) and routes the call internally to other hardware or software components of the terminating carrier. For instance, the terminating carrier receives the call at an ingress Session Border Controller (SBC) that conducts carrier-to-carrier communications. The ingress SBC routes the call to hardware and software components of an internal network (sometimes referred to as a "terminating network core") of the terminating carrier. The network core then routes the call and the call data for internal processing in conjunction with an analytics system (as in operation 410). Contemporaneously, the network core routes the call and call data to an egress SBC of the terminating carrier (as in operation 412).

In operation 408, a computing device or processor of the terminating network core extracts the call data from the telephony messaging and forwards the call data to the analytics system. For example, a processor of the terminating network core extracts SIP header metadata of a SIP INVITE message.

In some embodiments, the processor of the network core (or an analytics server of the analytics system) appends various types of identifying data associated with the caller device or the call to the call metadata. The identifying data includes, for example, a unique caller identifier, a unique destination identifier, and/or a tracking identifier.

In operation 410, a processor or other device of the terminating carrier forwards the call data to the analytics system. Using the call data, an analytics server of the analytics system performs one or more analytics operations (e.g., authentication operations, caller recognition operations, risk analysis operations) on behalf of the provider system.

For instance, the terminating network core extracts and forwards a call-invite message, including the telephony metadata, to the analytics system. For example, the terminating network core sends the SIP INVITE message and additional identifying data, such as the caller identifier, the destination provider identifier, and the tracking identifier. In some cases, the provider system supplies some or all of the identifying data to the terminating carrier and/or the analytics system at a time prior to the call. In some cases, the analytics server or the provider system generates and references a hash version of the identifying data (e.g., hash of tracking identifier, hash of destination provider identifier).

In operation 411, the analytics server stores the call data into a request database or other database of the analytics system (e.g., analytics database 104, 204). The request database is hosted by any non-transitory, machine-readable storage accessible to the analytics server. The database records of the request database store the call data of any number of current inbound calls directed to one or more provider systems, while the current calls await risk assessment by the analytics server on behalf of the one or more provider systems.

In some implementations, the analytics server returns an acknowledgement message according to the telephony protocol. The acknowledgement message includes a status identifier indicating the status of the call data and one or more identifiers associated with the inbound call. For example, the analytics server receives the call data of the inbound call and stores the call data into the request database. In this example, the analytics server then returns a SIP message indicating the analytics server successfully received the current call data (e.g., "202_accepted"). The analytics server further returns the hash of the destination provider identifier and tracking identifier for the call or caller device.

In operation 412, the terminating carrier routes the current inbound call to the provider system contemporaneous to (e.g., before, during, or after) sending the call data to the analytics system (as in operation 410). For instance, the processor or other hardware of the terminating network core routes the call to the egress SBC of the terminating carrier, which routes the call downstream to the provider system.

When routing the call to the provider system, the egress SBC transmits a telephony-based call invite message (e.g., SIP INVITE) to the provider system. The call invite message includes various types of metadata, including various identifiers for the carrier or source information (e.g., caller information), exclusive of the caller ANI. Non-limiting examples of the call data of the call invite message routed to the provider system include a protocol indicator, a caller identifier, a destination identifier, and a tracker identifier, among other types of information exclusive of exposing the caller ANI to the provider system.

The provider server of the provider system receives the call invite message from the terminating carrier. The provider server then transmits a threat assessment request to the analytics system, requesting one or more risk scores associated with the current, inbound call. The provider server executes call management software that queues and routes calls inbound call to the provider system. The provider server queues the call and stores the call data of the current call as received from the termination carrier. Prior to routing the inbound call to a particular agent device (e.g., agent computer or telephone), the provider server generates and transmits the threat assessment request. The provider server generates the threat assessment request using portions of the call data, including one or more types of identifiers (e.g., unique caller identifier, unique destination identifier, tracking identifier).

In operation 414, the analytics system receives the threat assessment request for one or more risk scores of the inbound call. The threat assessment request includes the one or more identifiers, which the analytics system references to query the analytics database and retrieve the call data of the inbound call.

In operation 416, the analytics server requests and receives telephony data (e.g., portability data) from a third-party vendor database (e.g., portability database). For instance, the analytics server transmits a telephony-data request for portability information associated with the caller device to a data vendor that hosts the vendor database. The telephony-data request includes a query for the telephony data stored in the third-party telephony data.

The analytics server transmits the telephony-data request containing the query to the third-party telephony database, requesting the telephony information (e.g., portability data) related to the caller device. Prior to transmitting the query to the telephony database, the analytics system strips the caller ANI and/or other identifying information from the query sent to the third-party database. For instance, the analytics server extracts and removes specific fields (e.g., phone number fields) from the SIP header of the SIP INVITE message. The analytics server may extract and remove the caller ANI from the SIP header. In some cases, the analytics server may extract and remove, for example, the caller CLI, caller P-CLI, network CLI (N-CLI), and diversion (redirecting) number(s) for the given call.

The analytics server receives a response from the data vendor containing the telephony data (e.g., portability data) about the caller device. Non-limiting examples of the portability data includes the caller carrier or CIC, country or country code, charge number or billing number, last-ported date, and line type, among other types of SIP-protocol data.

In operation 418, the analytics server generates the one or more risk scores for the call and returns the risk score(s) to the provider system. The analytics server generates one or more risk scores (e.g., risk score, device recognition score, fraud score, spoofing score) by applying executable software programming a machine-learning architecture on the telephony metadata (extracted from the call data received from the terminating carrier) and telephony data (retrieved from the third-party telephony database).

The analytics server generates a risk assessment message containing the one or more risk scores of the inbound call. The risk assessment message includes the one or more identifiers corresponding to the identifiers contained within the risk assessment request. The risk assessment message, however, excludes the caller ANI. The analytics server then transmits the risk assessment message to the provider system, reporting the one or more risk scores for the inbound call.

In operation 420, the provider server receives the risk assessment message and handles the inbound call based upon the risk score(s) generated and returned by the analytics server. The provider server routes the call and call data to an appropriate agent device to service the particular request prompted by the caller, in response to the provider server determining that the inbound call is a genuine call. Alternatively, if the provider server determines that the inbound call is likely fraudulent, the provider server performs one or more mitigation operations, such as dropping the call, requesting additional authenticating information from the caller, or routing the call to a risk mitigation agent of the provider system, among other potential mitigation operations.

The provider server automatically determines whether the one or more risk scores satisfy one or more corresponding threshold scores. The provider server includes the preprogrammed threshold scores, which the provider server compares against the risk scores received from the analytics server.

Additionally or alternatively, the provider server determines whether the one or more risk scores satisfy the one or more corresponding threshold scores, in response to user inputs received from an agent device. The provider server transmits the risk assessment message to the agent device, instructing the agent device to display the one or more risk scores at a user interface of the agent device. The agent decides whether to trust the inbound call and enters user inputs indicating the agent's decision. The agent device transmits the user inputs containing the instructions to the provider server. The provider server may then route the call to the (same or different) agent device or perform the one or more mitigation operations.

In some cases, the analytics server automatically indicates whether the one or more risk scores satisfy the one or more preprogrammed, corresponding threshold scores. The analytics server generates and compares the one or more risk scores against the preprogrammed threshold scores to determine the likelihood that the inbound call is a genuine call or fraudulent call. The analytics server generates the risk assessment message containing the risk score(s) and/or a fraud indicator, instructing the provider server whether to trust the inbound call and how to handle the inbound call. Based upon the instructions of the threat assessment message, the provider server may then route the call to an agent device or perform the one or more mitigation operations.

Figure 5:
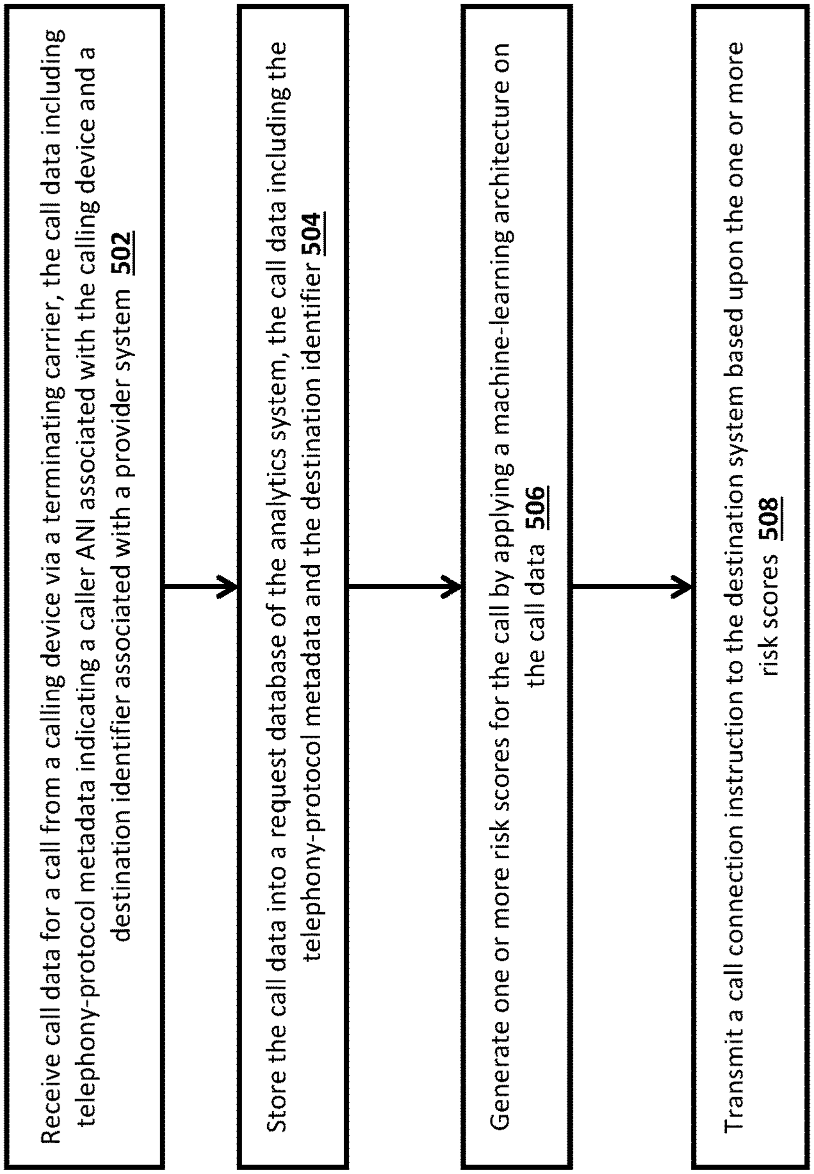
FIG. 5 shows execution operations of a method for assessing an amount of risk for calls on behalf of a provider system, according to an embodiment.

FIG. 5 shows execution operations of a method 500 for assessing an amount of risk for calls on behalf of a provider system. A server computer (e.g., analytics server 102) or other computing device of an analytics system performs the operations of the method 500, though any number of computers and any type of computing device may perform certain functions and features. Moreover, embodiments may include one or more computing devices of other computing systems or telecommunications systems that perform certain functions or features. Embodiments may include additional or alternative operations, or omit certain operations, and still fall within the scope of this disclosure. The server computer (of the analytics system) is logically and physically situated at a terminating carrier or otherwise in between an originating carrier and the destination provider system (i.e., prior to the destination provider system).

When operating, the analytics system receives call data from the terminating carrier for a call that originated at a caller device. The analytics system extracts a caller ANI from the call data and stores the caller ANI and other call data into a request database (e.g., analytics database 104). The analytics system generates one or more risk scores for the call on behalf of the provider system, and sends a risk assessment message to the provider system according to the one or more risk scores. The risk assessment message includes an instruction for the provider system to connect the call to an agent device (e.g., agent device 113, 213), though the risk assessment message excludes the caller ANI from the information available to the destination provider system. The various hardware and software components may communicate with analytics system via one or more APIs. For instance, the database records and database queries, including a risk assessment request or other messages, may be stored, transmitted, and received in any number of formats or data types, such as JSON, via one or more APIs.

In operation 502, the server of the analytics system receives, from a terminating carrier, call data of a call originated from a caller device. The call data includes telephony-protocol metadata indicates, for example, a caller ANI associated with the caller device and a destination identifier associated with the provider system, such as a destination provider system ANI.

In operation 504, the server stores the call data into a request database of the analytics system, the call data including the telephony-protocol metadata (e.g., SIP header metadata) and the destination identifier (e.g., provider system ANI). In operation 506, the server generates one or more risk scores for the call by applying executable software programming a machine-learning architecture on the call data.

In operation 508, the server transmits a call connection instruction to the destination system based upon the one or more risk scores. The server determines that the one or more risk scores satisfy corresponding threshold scores and transmits a risk assessment message. The risk assessment message includes an indicator for the provider server to connect call to an agent device. The provider server determines how to route the call, in accordance with the risk assessment message. For instance, the provider server determines that the call should be routed to a call center agent and agent device for handling the particular service requested by the caller (e.g., according to inputs to an IVR system). The provider server queues the call and transmits a risk assessment request to the analytics system. The server determines that the one or more risk scores satisfy the corresponding threshold scores and transmits the risk assessment message that indicates the call satisfies the one or more risk score thresholds and instructs the provider server to connect the call from the queue to the agent device.

Figure 6:
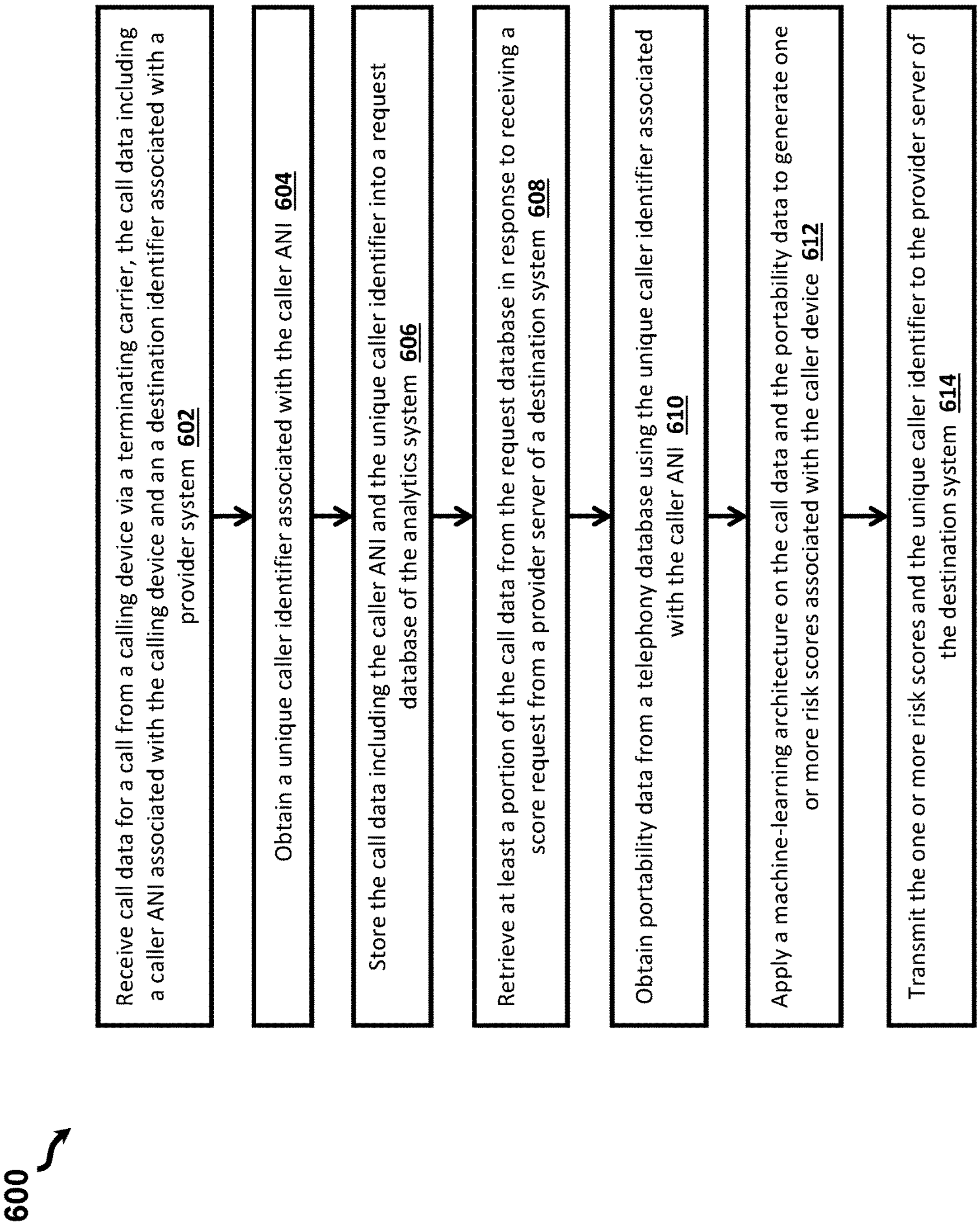
FIG. 6 shows execution operations of a method for assessing an amount of risk for calls on behalf of a provider system, according to an embodiment.

FIG. 6 shows execution operations of a method 600 for assessing an amount of risk for calls on behalf of a provider system. A server computer (e.g., analytics server 102, 202) or other computing device of an analytics system performs the execution operations of the method 600, though any number of computers and any type of computing device may perform certain functions and features. Moreover, embodiments may include one or more computing devices of other computing systems or telecommunications systems that perform certain functions or features. Embodiments may include additional or alternative operations, or omit certain operation, and still fall within the scope of this disclosure.

When operating, the analytics system receives call data from the terminating carrier for a call that originated at a caller device. The analytics system extracts a caller ANI from the call data and stores the caller ANI and other call data into a request database. The analytics system generates one or more risk scores for the call on behalf of the provider system and sends a risk assessment message to the provider system according to the one or more risk scores. The analytics system swaps a unique identifier (e.g., billing number, charge number, tracking identifier, provider-assigned unique caller identifier) of the caller device for the caller ANI. The risk assessment message, sent to the destination provider system, includes the one or more risk scores and the caller device's unique identifier (in lieu of the caller ANI). The various hardware and software components may communicate with analytics system via one or more APIs. For instance, the database records and database queries, including a risk assessment request or other messages, may be stored, transmitted, and received in any number of formats or data types, such as JSON, via one or more APIs.

In operation 602, the server of the analytics system receives call data for a call from a calling device via a terminating carrier, the call data including a caller ANI associated with the calling device and an a destination identifier associated with a provider system.

In operation 604, the server obtains a unique identifier for the caller device associated with the caller ANI. The unique identifiers may be stored in one or more databases, such as analytics databases, telecommunications carrier databases, and/or third-party telephony databases. Upon receiving and extracting the caller ANI, the analytics server queries the one or more databases for the unique identifiers and appends the unique identifiers to the call data.

In operation 606, the server stores the call data including the caller ANI and the unique caller identifier into a request database of the analytics system. In some cases, the analytics system stores the call data for the particular call until the analytics server receives a risk assessment request from the provider server a destination system.

In operation 608, the server retrieves at least a portion of the call data from the request database in response to receiving the risk assessment request (for one or more risk scores) from the provider server of the destination system. In operation 610, the server obtains portability data (or other types of portability data) from the third-party telephony database using the unique caller identifier associated with the caller ANI. In some cases, the analytics server stores the call data, include the portability data from the telephony database, into the request database.

In operation 612, the server applies and executes software routines of a machine-learning architecture on the call data and the portability data to generate one or more risk scores associated with the caller device. The server generates a risk assessment message including the one or more risk scores and various portions of the call data, including the one or more unique identifiers, exclusive of the caller ANI.

In operation 614, the server transmits the one or more risk scores and the unique caller identifier to the provider server of the destination system. In some implementations, the provider server determines how to route the call (e.g., determine which agent or agent device) and determines whether to connect the call based upon the one or more risk scores.

Figure 7:
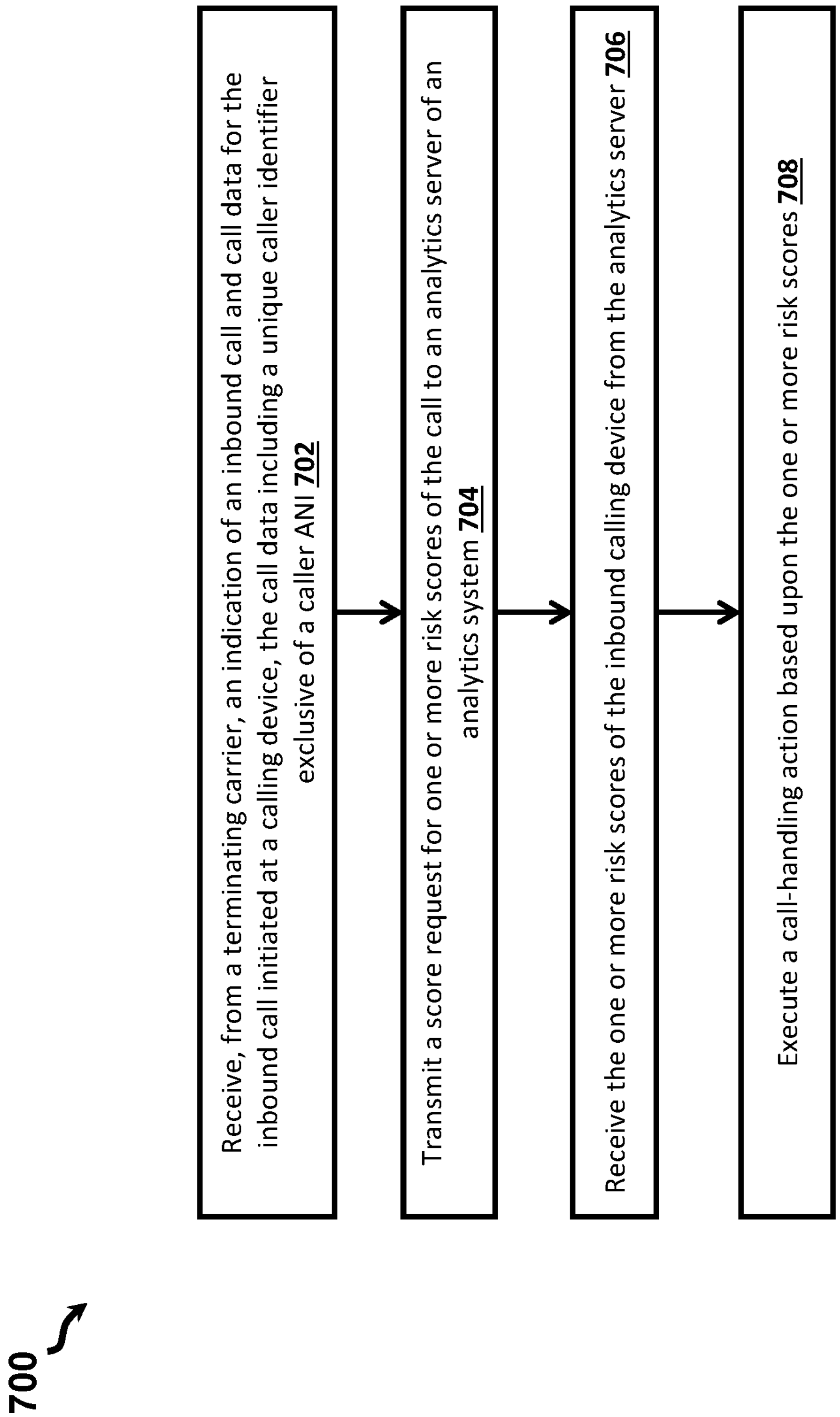
FIG. 7 shows execution operations of a method for handling inbound calls at a destination provider system based upon risk scores generated by and received from an analytics system, according to an embodiment.

FIG. 7 shows execution operations of a method 700 for handling inbound calls at a destination provider system based upon risk scores generated by and received from an analytics system. A server computer (e.g., provider server 111, 211) or other computing device of a destination provider system performs the execution operations of the method 700, though any number of computers and any type of computing device may perform certain functions and features. Moreover, embodiments may include one or more computing devices of other computing systems or telecommunications systems that perform certain functions or features. Embodiments may include additional or alternative operations, or omit certain operations, and still fall within the scope of this disclosure.

When operating, the provider system (e.g., enterprise call center) receives call data, such as telephony metadata, for an inbound call, as routed from a terminating carrier. The call data, as received from the terminating carrier or the analytics system, includes a unique caller identifier (e.g., billing number, charge number, tracking identifier, provider-assigned unique caller identifier) indicating the particular caller or caller device that originated the inbound call. The provider system receives the inbound call and generates a risk assessment request, which requests one or more risk scores from an analytics system. The analytics system is logically or physically situated in between the originating carrier and the provider system, such that the analytics system receives the call data from the terminating carrier or the originating carrier. The provider system receives a risk assessment message from the analytics system. The risk assessment message includes the one or more risk scores for the inbound call and may include portions of the call data that excludes the caller ANI associated with the caller device, and includes the unique caller identifier (in lieu of the caller ANI). The various hardware and software components may communicate with analytics system via one or more APIs. For instance, the database records and database queries, including a risk assessment request or other messages, may be stored, transmitted, and received in any number of formats or data types, such as JSON, via one or more APIs.

In operation 702, the server of the provider system receives, from a terminating carrier, an indication of an inbound call and call data for the inbound call initiated at a calling device, the call data including a unique caller identifier exclusive of a caller ANI.

In operation 704, the server transmits a risk assessment request for one or more risk scores of the call to the analytics server of the analytics system. The risk assessment request includes one or more unique identifiers of the caller device, as received from the terminating carrier or the analytics server. The unique identifiers allow the analytics server to identify the particular database records or telephony data related to the particular call, without requiring the server and the analytics system to communicate using the caller ANI.

In operation 706, the server receives the one or more risk scores of the inbound calling device from the analytics server. The server receives a risk assessment message from the analytics server responding to the server's risk assessment request (as sent in operation 704). The risk assessment message includes, for example, the one or more risk scores associated with the particular inbound call, the one or more unique identifiers for the caller device, and, in some cases, various types of telephony metadata.

In operation 708, the server executes a call-handling action based upon the one or more risk scores reported in the risk assessment message. The server (or other computing device) of the provider system executes call management software that queues and routes inbound calls to particular agents or agent devices based upon the particular services requested by the caller device (e.g., user inputs entered into an IVR system). Additionally or alternatively, the server routes the calls to particular agents or agent devices based upon the one or more risk scores. For example, the server may determine to route the call to a service agent device based upon the caller's requests, but then determine to route the call instead to an anti-fraud agent device because a risk score failed to satisfy the corresponding threshold value.

The call-handling action includes any number of potential operations performed by the call management software based upon the routing rules and the risk assessment message. When operating, the server receives the risk assessment message and handles the inbound call based upon the risk score(s) generated and returned by the analytics server. As an example, if the server determines that the call is genuine, then the call management software performs a call-handling operation that routes the call and call data to an appropriate agent device to service the particular request prompted by the caller. Alternatively, if the provider server determines that the inbound call is likely fraudulent, then the call management software performs a call-handling operation that performs one or more mitigation operations, such as dropping the call, requesting additional authenticating information from the caller, or routing the call to a risk mitigation or anti-fraud agent of the provider system, among other potential mitigation or call-handling operations.

Figure 8:
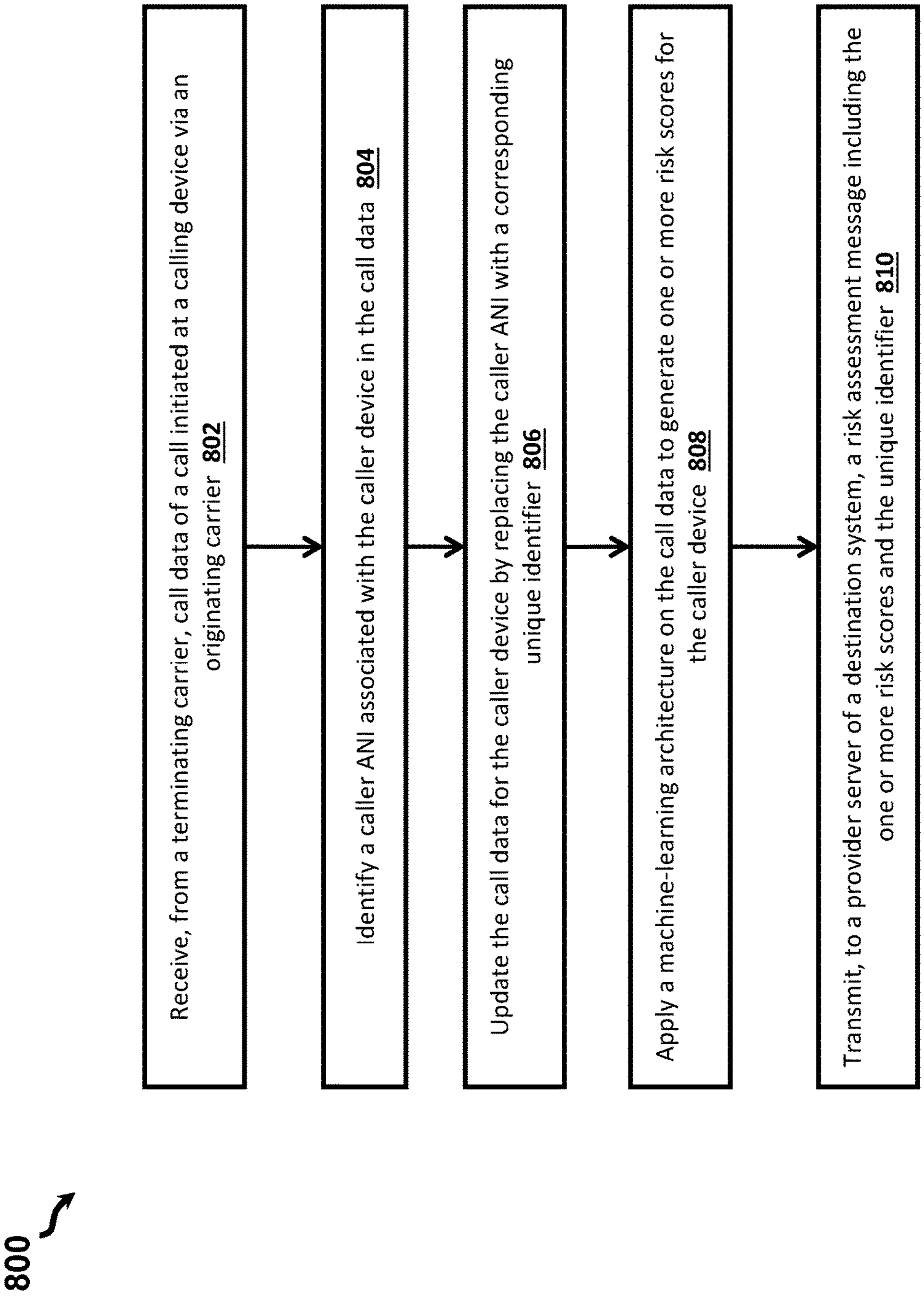
FIG. 8 shows execution operations of a method for assessing an amount of risk for calls on behalf of a provider system, according to an embodiment.

FIG. 8 shows execution operations of a method 800 for assessing an amount of risk for calls on behalf of a provider system. A server computer (e.g., analytics server 102, 202) or other computing device of an analytics system performs the operations of the method 800, though any number of computers and any type of computing device may perform certain functions and features. Moreover, embodiments may include one or more computing devices of other computing systems or telecommunications systems that perform certain functions or features. Embodiments may include additional or alternative operations, or omit certain operations, and still fall within the scope of this disclosure.

When operating, the analytics system receives call data from the terminating carrier for a call that originated at a caller device. The analytics system extracts a caller ANI from the call data and, using the caller ANI, the analytics system identifies one or more unique identifiers of the caller (e.g., billing number, charge number, tracking identifier, provider-assigned unique caller identifier) corresponding to the caller ANI. The analytics system updates the call data for the inbound call by swapping the caller ANI for the one or more unique identifiers. The analytics system then stores the call data into a request database (e.g., analytics database 104, 204). The analytics system receives a risk assessment request from the provider system containing a request for one or more risk scores for the inbound call. The risk assessment request includes the one or more unique identifiers (e.g., charge number, billing number, tracking identifier, unique caller identifier) associated with the inbound call and caller device. The analytics system retrieves the call data from the request database according to the one or more unique identifiers in the risk assessment request, and generates the one or more risk scores based upon the call data. The various hardware and software components may communicate with analytics system via one or more APIs. For instance, the database records and database queries, including a risk assessment request or other messages, may be stored, transmitted, and received in any number of formats or data types, such as JSON, via one or more APIs.

In operation 802, the server of the analytics system receives, from a terminating carrier, call data of a call initiated at a calling device via an originating carrier. The call data includes telephony-protocol metadata indicates, for example, a caller ANI associated with the caller device and a destination identifier associated with the provider system, such as a destination provider system ANI. In operation 804, the server identifies a caller ANI (or other phone numbers) associated with the caller device in the call data.

In operation 806, the server updates the call data for the caller device by replacing the caller ANI with a corresponding unique identifier. The server queries and retrieves various types of caller device data or telephony data (e.g., portability data) from an analytics database of the analytics system, the terminating carrier, or a third-party telephony database for the one or more unique identifiers associated with the caller ANI or the caller device. The server then replaces the caller ANI with the one or more unique identifiers, allowing the server to redact or obscure the caller ANI in communications with the provider server or other systems.

In operation 808, the server applies and executes software routines of a machine-learning architecture on the call data to generate one or more risk scores for the caller device. The server may apply the executable software routines of the machine-learning architecture on the call data from the terminating carrier and/or the telephony data received from the third-party telephony database to generate the one or more risk scores. The server then generates a risk assessment message containing the one or more risk scores for the call.

In operation 810, the server transmits the risk assessment message to a provider server of a destination provider system. The risk assessment message includes the one or more risk scores and the unique identifier associated with the caller device, exclusive of the caller ANI.

Figure 9:
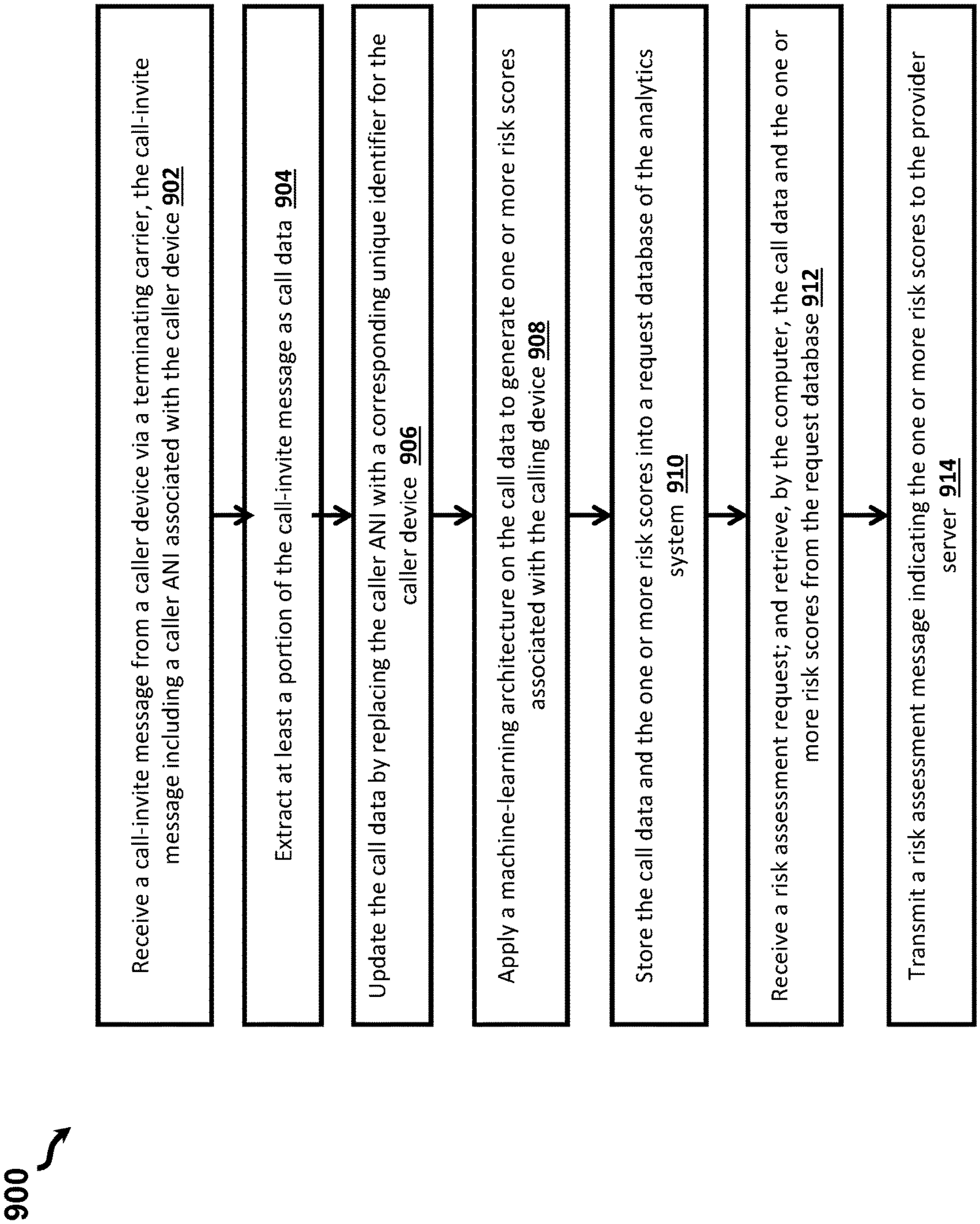
FIG. 9 shows execution operations of a method for assessing an amount of risk for calls on behalf of a provider system, according to an embodiment.

FIG. 9 shows execution operations of a method 900 for assessing an amount of risk for calls on behalf of a provider system. A server computer (e.g., analytics server 102, 202) or other computing device of an analytics system performs the operations of the method 900, though any number of computers and any type of computing device may perform certain functions and features. Moreover, embodiments may include one or more computing devices of other computing systems or telecommunications systems that perform certain functions or features. Embodiments may include additional or alternative operations, or omit certain operations, and still fall within the scope of this disclosure.

When operating, the analytics system receives a call-invite message (e.g., SIP INVITE) according to a telephony protocol (e.g., SIP). The analytics system extracts and stores call data of the call-invite message into a request database (e.g., analytics database 104, 204). The call data stored into the request database includes one or more unique identifiers (e.g., billing number, charge number, provider-assigned unique caller identifier) associated with the caller device or caller. In some cases, however, the analytics server stores the one or more unique identifiers into the request database, exclusive of the call-invite message or exclusive of some or all of the metadata of the call-invite message. The analytics server generates a risk assessment message containing one or more risk scores for the inbound call. The analytics server generates the one or more risk scores using, for example, the call data of the call-invite message and/or telephony data (e.g., portability data) retrieved from a telephony database (e.g., third-party database 108, 208). The risk assessment message includes the one or more unique identifiers for the caller device, exclusive of the caller ANI and, in some cases, at least a portion of the call-invite message. The various hardware and software components may communicate with analytics system via one or more APIs. For instance, the database records and database queries, including a risk assessment request or other messages, may be stored, transmitted, and received in any number of formats or data types, such as JSON, via one or more APIs.

In operation 902, the server of the analytics system receives a call-invite message from a caller device via a terminating carrier, the call-invite message including a caller ANI associated with the caller device.

In operation 904, the server extracts some or all of the telephony metadata from the call-invite message. In some cases, the server includes a portion of the metadata in the call-invite message in the call data. The server may extract and store the various types of data and store the data in any number of formats or data types, such as JSON objects or the like.

In operation 906, the server updates the call data by replacing the caller ANI with a corresponding unique identifier for the caller device. The server queries and retrieves various types of caller device data or telephony data (e.g., portability data) from an analytics database of the analytics system, the terminating carrier, or a third-party telephony database for the one or more unique identifiers associated with the caller ANI or the caller device. The server then replaces the caller ANI with the one or more unique identifiers, allowing the server to redact or obscure the caller ANI in communications with the provider server or other systems.

In operation 908, the server applies and executes software routines of a machine-learning architecture on the call data to generate one or more risk scores associated with the calling device. In operation 910, the server stores the call data and the one or more risk scores into a request database of the analytics system. The request database stores this call data and the one or more risk scores until the server receives a risk assessment request from the provider server. The database records and database queries, including a risk assessment request, may be stored, transmitted, and received in any number of formats or data types, such as JSON, via one or more APIs.

In operation 912, the server receives a risk assessment request; and retrieves the call data and the one or more risk scores from the request database. The risk assessment request instructs the server to provide a risk assessment message containing the one or more risk scores. In response to receiving the risk assessment request, the server retrieves the call data and the one or more risk scores from the request database using the one or more unique identifiers in the risk assessment request. In operation 914, the server transmits the risk assessment message indicating the one or more risk scores to the provider server. The server may transmit the risk assessment response message in any number of formats or data types, such as JSON, via one or more APIs.

Additional Example Embodiments

In some embodiments, a system or a computer-implemented method assess risks of calls without exposing caller automatic identification numbers (ANIs) to call destinations, performed by computing hardware and software of an analytics system including at least one computer having at least one processor. A computer of an analytics system may receive call data for a call from a calling device via a terminating carrier. The call data may include telephony-protocol metadata indicating a caller ANI associated with the calling device and a destination identifier associated with a provider system. The computer may store the call data into a request database of the analytics system. The call data may include the telephony-protocol metadata and the destination identifier. The computer may generate one or more risk scores for the call by executing a machine-learning architecture on the call data. The computer may transmit a call connection instruction to the destination system based upon the one or more risk scores.

The computer may obtain a unique caller identifier associated with the caller ANI, wherein the call data stored into the request database includes the unique caller identifier associated with the caller ANI.

The computer may obtain, from a portability database, portability data associated with the calling device. The computer may generate the one or more risk scores by executing the machine-learning architecture on the call data and the portability data associated with the calling device.

When obtaining the portability data associated with the calling device, the computer may extract the caller ANI from the call data received from the terminating carrier; and transmit, to the portability database, the request for the portability data exclusive of the caller ANI.

The computer may transmit the one or more risk scores and a portion of the call data to the provider server exclusive of the caller ANI.

The call data received from the terminating carrier may include a privacy instruction instructing the computer to obfuscate the caller ANI from the provider system.

The call data may include an invitation message according to a telephony protocol.

When receiving the call data, the computer may obtain a unique caller identifier corresponding to the caller ANI; and append the unique caller identifier to the call data. The computer may store the unique caller identifier into the request database with the call data.

The destination identifier may include at least one of: a destination ANI for the destination system or a phone number for the destination system.

The computer may receive, from a server of a provider system, a score request for the one or more risk scores of the call.

When generating the one or more risk scores, the computer may execute a feature extraction engine of the machine-learning architecture on the call data and the portability data to extract a current deviceprint for the calling device; and calculate the one or more risk scores using one or more corresponding predetermined vectors stored in an analytics database, each risk score is based upon a distance between the current deviceprint and a corresponding predetermined vector.

The one or more risk scores may include a device recognition score for the calling device. The predetermined vector may include an enrolled deviceprint for an enrolled device. The computer may obtain the enrolled deviceprint based upon enrollment data associated with the enrolled device; and calculate the device recognition score for the calling device based upon the distance between the enrolled deviceprint and the current deviceprint.

The one or more risk scores may include a spoof risk score for the calling device. The one or more predetermined vectors may include one or more spoofprints for one or more spoofed devices. The computer may obtain a spoofprint for a spoofed device based upon spoofed call data associated with the spoofed calling device; and calculate the spoof risk score for the calling device based upon the distance between the spoofprint and a predetermined spoofprint. The spoof risk score may indicate a likelihood that the calling device is the spoofed device.

The computer may execute the machine-learning architecture on training call data of a plurality of training calls for a plurality of training devices to train the machine-learning architecture using a plurality of training labels corresponding to the plurality of training calls.

The computer may detect the caller ANI in the call data; and remove the caller ANI from the call data prior to transmitting the call data to the destination system.

In some embodiments, a system or a computer-implemented method assess risks of calls without exposing caller automatic identification numbers (ANIs) to call destinations, performed by computing hardware and software of an analytics system including at least one computer having at least one processor. A computer of an analytics system may receive call data for a call from a calling device via a terminating carrier. The call data may include a caller ANI associated with the calling device and a destination identifier associated with a provider system. The computer may obtain a unique caller identifier associated with the caller ANI. The computer may store the call data including the caller ANI and the unique caller identifier into a request database of the analytics system. The computer may retrieve at least a portion of the call data from the request database in response to receiving a score request from a provider server of a destination system. The computer may obtain portability data from a telephony database using the unique caller identifier associated with the caller ANI. The computer may execute a machine-learning architecture on the call data and the portability data to generate one or more risk scores associated with the caller device. The computer may transmit the one or more risk scores and the unique caller identifier to the provider server of the destination system.

The computer may transmit the one or more risk scores and a portion of the call data to the provider server exclusive of the caller ANI.

The unique caller identifier of the calling device may include at least one of: a billing number, a charge number, or a provider-assigned identifier.

The computer may extract the caller ANI from the call data received from the terminating carrier; and transmit, to the portability database, the request for the portability data exclusive of the caller ANI.

The computer may detect the caller ANI of the caller device in the call data; and remove the caller ANI from the call data prior to transmitting the call data to the provider server of the destination system.

The computer may update the call data by replacing the caller ANI with the unique identifier.

The call data received from the terminating carrier may include a privacy instruction instructing the computer to obfuscate the caller ANI from the provider system.

When generating the one or more risk scores, the computer may execute a feature extraction engine of the machine-learning architecture on the call data and the portability data to extract a current deviceprint for the calling device. The computer may calculate the one or more risk scores using one or more corresponding predetermined vectors stored in an analytics database, each risk score based upon a distance between the current deviceprint and a corresponding predetermined deviceprint.

The one or more risk scores may include a device recognition score for the calling device. The predetermined vector may include an enrolled deviceprint for an enrolled device. The computer may obtain the enrolled deviceprint based upon enrollment data associated with the enrolled device; and calculate the device recognition score for the calling device based upon the distance between the enrolled deviceprint and the current deviceprint.

The one or more risk scores may include a spoof risk score for the calling device. The one or more predetermined vectors may include one or more spoofprints for one or more spoofed devices. The computer may obtain a spoofprint for a spoofed device based upon spoofed call data associated with the spoofed calling device; and calculate the spoof risk score for the calling device based upon the distance between the spoofprint and a predetermined spoofprint. The spoof risk score may indicate a likelihood that the calling device is the spoofed device.

The computer may execute the machine-learning architecture on training call data of a plurality of training calls for a plurality of training devices to train the machine-learning architecture using a plurality of training labels corresponding to the plurality of training calls.

In some embodiments, a system or a computer-implemented method assess risks of calls without exposing caller automatic identification numbers (ANIs) to call destinations, performed by computing hardware and software of an analytics system including at least one computer having at least one processor. A computer of an analytics system may The method comprises receiving, by a computer of a provider system, from a terminating carrier, an indication of an inbound call and call data for the inbound call initiated at a calling device, the call data including a unique caller identifier exclusive of a caller ANI; transmitting, by the computer, a score request for one or more risk scores of the call to an analytics server of an analytics system; receiving, by the computer, the one or more risk scores of the inbound calling device from the analytics server; and executing, by the computer, a call-handling action based upon the one or more risk scores.

In some implementations, the one or more risk scores include at least one of a device recognition score, a fraud risk score, or a spoof risk score.

In some implementations, executing the call-handling action includes updating, by the computer, a user interface to indicate the one or more risk scores.

In some implementations, the method further includes forwarding, by the computer, the one or more risk scores to an agent device having the user interface.

In some implementations, executing the call-handling action includes routing, by the computer, the inbound call to an agent device of the provider system, in response to the computer determining that a risk score of the one or more risk scores satisfies a threshold score.

In some implementations, executing the call-handling action includes dropping, by the computer, the inbound call, in response to determining that a risk score of the one or more risk scores fails a risk threshold score.

In some implementations, the unique caller identifier includes at least one of a billing number, a charge number, or a provider-assigned identifier.

In some embodiments, a system or a computer-implemented method assess risks of calls without exposing caller automatic identification numbers (ANIs) to call destinations, performed by computing hardware and software of an analytics system including at least one computer having at least one processor. A computer of an analytics system may receive, from a terminating carrier, call data of a call initiated at a calling device via an originating carrier. The computer may identify a caller ANI associated with the caller device in the call data. The computer may update the call data for the caller device by replacing the caller ANI with a corresponding unique identifier. The computer may execute a machine-learning architecture on the call data to generate one or more risk scores for the caller device. The computer may transmit, to a provider server of a destination system, a risk assessment message including the one or more risk scores and the unique identifier.

When receiving the call data from the terminating carrier, the computer may store the call data into a request database. The computer may execute the machine-learning architecture on the call data stored in the request database.

When updating the call data for the calling device, the computer may query one or more databases for the unique identifier corresponding to the caller ANI to obtain the unique identifier for replacing the caller ANI.

When generating the one or more risk scores for the caller device, the computer may receive, from the provider server of the destination system, a risk assessment request for the one or more risk scores.

When generating the one or more risk scores for the caller device, the computer may obtain portability data associated with the caller device stored in one or more databases. The computer may execute the machine-learning architecture on the call data and the portability data to generate the one or more risk scores.

The risk assessment message may include a connection instruction.

The computer may transmit the risk assessment message to the provider server using a destination ANI of a destination system in the call data.

When generating the one or more risk scores, the computer may execute a feature extraction engine of the machine-learning architecture on the call data and the portability data to extract a current deviceprint for the calling device; and calculate the one or more risk scores using one or more corresponding predetermined vectors stored in an analytics database, each risk score based upon a distance between the current deviceprint and a corresponding predetermined vector.

The one or more risk scores may a device recognition score for the calling device. The predetermined vector may an enrolled deviceprint for an enrolled device. The computer may obtain the enrolled deviceprint based upon enrollment data associated with the enrolled device; and calculate the device recognition score for the calling device based upon the distance between the enrolled deviceprint and the current deviceprint.

The one or more risk scores may include a spoof risk score for the calling device. The one or more predetermined vectors may include one or more spoofprints for one or more spoofed devices. The computer may obtain a spoofprint for a spoofed device based upon spoofed call data associated with the spoofed calling device; and calculate the spoof risk score for the calling device based upon the distance between the spoofprint and a predetermined spoofprint. The spoof risk score indicating a likelihood that the calling device is the spoofed device.

The computer may execute the machine-learning architecture on training call data of a plurality of training calls for a plurality of training devices to train the machine-learning architecture using a plurality of training labels corresponding to the plurality of training calls.

The one or more risk scores may include at least one of a fraud risk score, a device recognition score, or a spoof risk score.

In some embodiments, a system or a computer-implemented method assess risks of calls without exposing caller automatic identification numbers (ANIs) to call destinations, performed by computing hardware and software of an analytics system including at least one computer having at least one processor. A computer of an analytics system may receive a call-invite message from a caller device via a terminating carrier. The call-invite message may include a caller ANI associated with the caller device. The computer may extract at least a portion of the call-invite message as call data. The computer may update the call data by replacing the caller ANI with a corresponding unique identifier for the caller device. The computer may execute a machine-learning architecture on the call data to generate one or more risk scores associated with the calling device. The computer may store the call data and the one or more risk scores into a request database of the analytics system. In response to the computer receiving a risk assessment request from a provider server of a destination system: the computer may retrieve the call data and the one or more risk scores from the request database. The computer may transmit a risk assessment message indicating the one or more risk scores to the provider server.

The unique caller identifier may include at least one of a billing number, a charge number, or a provider-assigned identifier.

The computer may obtain portability data from a telephony database using the unique caller identifier associated with the caller ANI. The computer may execute the machine-learning architecture on the call data and the portability data to generate the one or more risk scores.

When generating the one or more risk scores, the computer may execute a feature extraction engine of the machine-learning architecture on the call data and portability data to extract a current deviceprint for the caller device; and calculate the one or more risk scores using one or more corresponding predetermined vectors stored in an analytics database, each risk score based upon a distance between the current deviceprint and a corresponding predetermined vector.

The one or more risk scores may include a device recognition score for the calling device. The predetermined vector may include an enrolled deviceprint for an enrolled device. The computer may obtain the enrolled deviceprint based upon enrollment data associated with the enrolled device; and calculate the device recognition score for the calling device based upon the distance between the enrolled deviceprint and the current deviceprint.

The one or more risk scores may a spoof risk score for the calling device. The one or more predetermined vectors may include one or more spoofprints for one or more spoofed devices. The computer may obtain a spoofprint for a spoofed device based upon spoofed call data associated with the spoofed calling device; and calculate the spoof risk score for the calling device based upon the distance between the spoofprint and a predetermined spoofprint. The spoof risk score indicating a likelihood that the calling device is the spoofed device.

The computer may execute the machine-learning architecture on training call data of a plurality of training calls for a plurality of training devices to train the machine-learning architecture using a plurality of training labels corresponding to the plurality of training calls.

The call-invite message may include a destination identifier associated with the destination system.

The call-invite message may include a privacy instruction instructing the computer to obfuscate the caller ANI from the provider system.

The computer may extract the caller ANI from the call data prior to transmitting the risk assessment message to the provider server.

The various illustrative logical blocks, modules, circuits, operations, and algorithm steps described in connection with the embodiments disclosed herein may be implemented as electronic hardware, computer software, or combinations of both. To clearly illustrate this interchangeability of hardware and software, various illustrative components, blocks, modules, circuits, operations, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, attributes, or memory contents. Information, arguments, attributes, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The execution operations or steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method of assessing risks of calls without exposing caller automatic identification numbers (ANIs) to call destinations, the method comprising:
- receiving, by a computer of an analytics system, call data for a call from a calling device via a terminating carrier, the call data including telephony-protocol metadata indicating a caller ANI associated with the calling device and a destination identifier associated with a destination provider system;
- storing, by the computer, the call data into a request database of the analytics system, the call data including the telephony-protocol metadata and the destination identifier;
- generating, by the computer, one or more risk scores for the call by executing a machine-learning architecture on the call data; and
- transmitting, by the computer, a call connection instruction to the destination provider system associated with the destination identifier based upon the one or more risk scores, wherein the computer obfuscates the caller ANI from the destination provider system.

2. The method according to claim 1, further comprising obtaining, by the computer, a unique caller identifier associated with the caller ANI, wherein the call data stored into the request database includes the unique caller identifier associated with the caller ANI.

3. The method according to claim 1, further comprising obtaining, by the computer from a portability database, portability data associated with the calling device, wherein the computer generates the one or more risk scores by executing the machine-learning architecture on the call data and the portability data associated with the calling device.

4. The method according to claim 3, wherein obtaining the portability data associated with the calling device includes:

extracting, by the computer, the caller ANI from the call data received from the terminating carrier; and transmitting, by the computer to the portability database, the request for the portability data exclusive of the caller ANI.

5. The method according to claim 1, wherein the computer transmits the one or more risk scores and a portion of the call data to the destination provider system exclusive of the caller ANI.

6. The method according to claim 1, wherein the call data received from the terminating carrier includes a privacy instruction instructing the computer to obfuscate the caller ANI from the destination provider system.

7. The method according to claim 1, wherein the call data includes an invitation message according to a telephony protocol.

8. The method according to claim 1, wherein receiving the call data includes:

obtaining, by the computer, a unique caller identifier corresponding to the caller ANI; and appending, by the computer, the unique caller identifier to the call data, wherein the computer stores the unique caller identifier into the request database with the call data.

9. The method according to claim 1, wherein the destination identifier includes at least one of: a destination ANI for the destination provider system or a phone number for the destination provider system.

10. The method according to claim 1, further comprising receiving, by the computer from a server of the destination provider system, a score request for the one or more risk scores of the call.

11. The method according to claim 1, wherein generating the one or more risk scores includes:

executing, by the computer, a feature extraction engine of the machine-learning architecture on the call data and portability data to extract a current deviceprint for the calling device; and calculating, by the computer, the one or more risk scores using one or more corresponding predetermined vectors stored in an analytics database, each risk score based upon a distance between the current deviceprint and a corresponding predetermined vector.

12. The method according to claim 11, wherein the one or more risk scores includes a device recognition score for the calling device, and wherein the predetermined vector includes an enrolled deviceprint for an enrolled device, the method further comprising:

obtaining, by the computer, the enrolled deviceprint based upon enrollment data associated with the enrolled device; and calculating, by the computer, the device recognition score for the calling device based upon the distance between the enrolled deviceprint and the current deviceprint.

13. The method according to claim 11, wherein the one or more risk scores includes a spoof risk score for the calling device, and wherein the one or more predetermined vectors include one or more spoofprints for one or more spoofed devices, the method further comprising:

obtaining, by the computer, a spoofprint for a spoofed device based upon spoofed call data associated with the spoofed device; and calculating, by the computer, the spoof risk score for the calling device based upon the distance between the spoofprint and a predetermined spoofprint, the spoof risk score indicating a likelihood that the calling device is the spoofed device.

14. The method according to claim 1, further comprising executing, by the computer, the machine-learning architecture on training call data of a plurality of training calls for a plurality of training devices to train the machine-learning architecture using a plurality of training labels corresponding to the plurality of training calls.

15. The method according to claim 1, further comprising:

detecting, by the computer, the caller ANI in the call data; and removing, by the computer, the caller ANI from the call data prior to transmitting the call data to the destination provider system.

16. A system for assessing risks of calls without exposing caller automatic identification numbers (ANIs) to call destinations, the system comprising:

a computer comprising at least one processor of an analytics system, the computer configured to:

receive call data for a call from a calling device via a terminating carrier, the call data including telephony-protocol metadata indicating a caller ANI associated with the calling device and a destination identifier associated with a destination provider system;

store the call data into a request database of the analytics system, the call data including the telephony-protocol metadata and the destination identifier;

generate one or more risk scores for the call by executing a machine-learning architecture on the call data; and transmit a call connection instruction to the destination provider system associated with the destination identifier based upon the one or more risk scores, wherein the computer obfuscates the caller ANI from the destination provider system.

17. The system according to claim 16, wherein the computer is configured to obtain a unique caller identifier associated with the caller ANI, wherein the call data stored into the request database includes the unique caller identifier associated with the caller ANI.

18. The system according to claim 16, wherein the computer is configured to obtain, from a portability database, portability data associated with the calling device, and wherein the computer generates the one or more risk scores by executing the machine-learning architecture on the call data and the portability data associated with the calling device.

19. The system according to claim 16, wherein the computer is configured to transmit the one or more risk scores and a portion of the call data to the destination provider system exclusive of the caller ANI, in accordance with a privacy instruction received from the terminating carrier to obfuscate the caller ANI from the destination provider system.

20. The system according to claim 16, wherein, when generating the one or more risk scores, the computer is configured to:

execute a feature extraction engine of the machine-learning architecture on the call data and portability data to extract a current deviceprint for the calling device; and calculate the one or more risk scores using one or more corresponding predetermined vectors stored in an analytics database, each risk score based upon a distance between the current deviceprint and a corresponding predetermined vector.

* * * * *